(12) United States Patent
Ushitama et al.

(10) Patent No.: US 7,295,267 B2
(45) Date of Patent: Nov. 13, 2007

(54) COLOR FILTER SUBSTRATE, METHOD OF MANUFACTURING THE SAME, DISPLAY DEVICE, LIQUID CRYSTAL DISPLAY DEVICE AND ELECTRONIC EQUIPMENT

(75) Inventors: Toshihiro Ushitama, Chino (JP); Hisashi Aruga, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/451,361

(22) Filed: Jun. 13, 2006

(65) Prior Publication Data

US 2006/0274240 A1    Dec. 7, 2006

Related U.S. Application Data

(63) Continuation of application No. 10/898,983, filed on Jul. 27, 2004.

(30) Foreign Application Priority Data

Aug. 7, 2003   (JP) .............................. 2003-289082

(51) Int. Cl.
*G02F 1/1335*   (2006.01)
(52) U.S. Cl. ................ 349/106; 349/114; 349/187
(58) Field of Classification Search ................ 349/114, 349/106, 110, 138, 113, 187; 353/84
See application file for complete search history.

(56) References Cited

U.S. PATENT DOCUMENTS

| | | | |
|---|---|---|---|
| 6,468,702 B1 | 10/2002 | Yi et al. | |
| 6,573,960 B2 | 6/2003 | Kobayashi et al. | |
| 6,657,687 B2 | 12/2003 | Takizawa | |
| 6,697,137 B2 | 2/2004 | Nemoto et al. | |
| 6,798,473 B2 | 9/2004 | Kaneda et al. | |
| 6,872,586 B2 * | 3/2005 | Kiguchi et al. | ............... 438/28 |
| 6,873,384 B2 | 3/2005 | Yamanaka et al. | |
| 6,893,781 B2 | 5/2005 | Nonaka et al. | |
| 6,900,864 B2 | 5/2005 | Iino | |
| 7,079,206 B2 | 7/2006 | Ha | |
| 2003/0128310 A1 | 7/2003 | Takizawa et al. | |

FOREIGN PATENT DOCUMENTS

| | | |
|---|---|---|
| JP | A-9-329706 | 12/1997 |
| JP | A-10-260307 | 9/1998 |
| JP | A-11-194211 | 7/1999 |
| JP | A-2001-33778 | 2/2001 |
| JP | A-2002-287131 | 10/2002 |
| JP | A-2003-121635 | 4/2003 |

\* cited by examiner

*Primary Examiner*—Thoi V. Duong
(74) *Attorney, Agent, or Firm*—Oliff & Berridge, PLC

(57) ABSTRACT

To provide a color filter substrate that is suitable for being appropriately applied with a liquid color filter material, a manufacturing method thereof, a display device, a liquid crystal display device and electronic equipment. A color filter substrate includes a first layer having an opening, a reflective part, a transmissive part and a filter layer that is placed on the opening and formed to cover the reflective part and the transmissive part. The transmissive part is an opening of the reflective part and has an approximately elliptical shape.

2 Claims, 17 Drawing Sheets

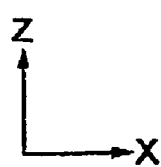
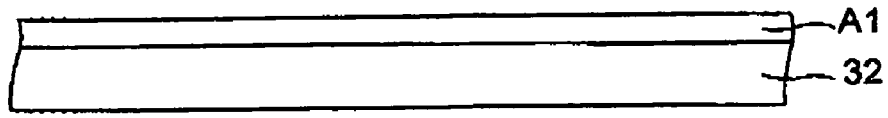
FIG. 8(a)
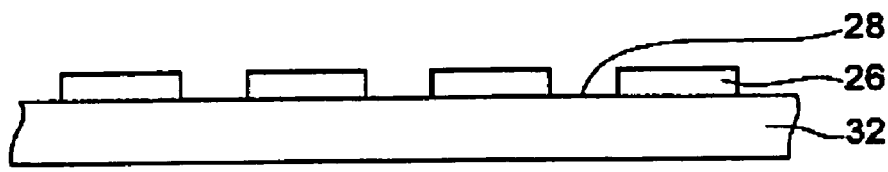
FIG. 8(b)
FIG. 8(c)
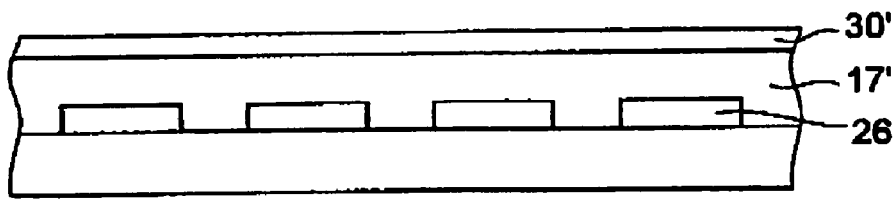
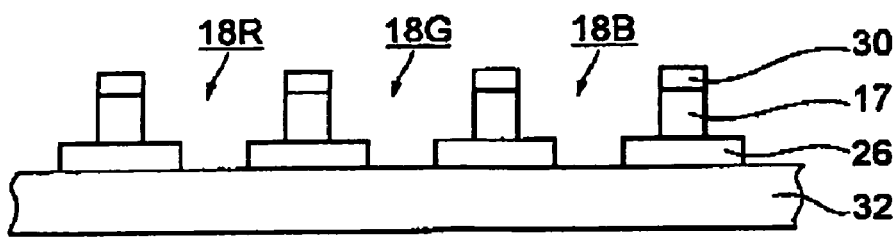
FIG. 8(d)

FIG. 20
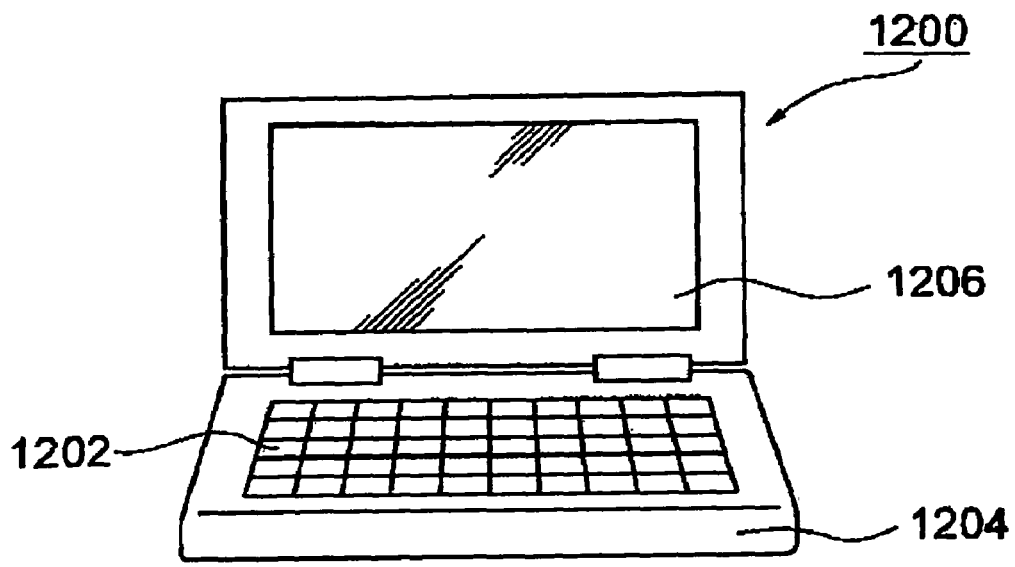
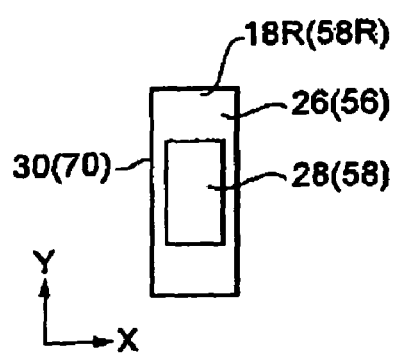
FIG. 21(a)
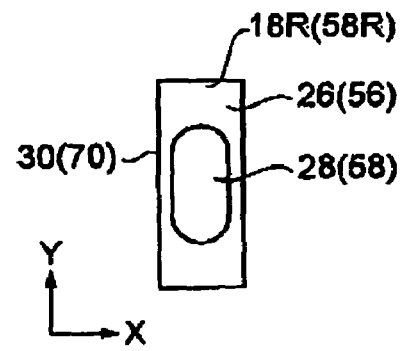
FIG. 21(b)

COLOR FILTER SUBSTRATE, METHOD OF MANUFACTURING THE SAME, DISPLAY DEVICE, LIQUID CRYSTAL DISPLAY DEVICE AND ELECTRONIC EQUIPMENT

BACKGROUND OF THE INVENTION

1. Field of Invention

Aspects of the invention can relate to a liquid crystal display device and a manufacturing method thereof. More particularly, the invention can relate to a color filter in which a single pixel area has a transmissive part and a reflective part and a manufacturing method thereof.

2. Description of Related Art

A related manufacturing apparatus to manufacture a color filter by discharging color filter ink drops onto a color filter substrate through an ink-jet head is disclosed in, for example, Japanese Unexamined Patent Publication No. 10-260307.

A color filter emits only a specific wavelength light by not transmitting light that enters into a filter layer other than the specific wavelength light, and emits a light having a color that corresponds to the specific wave length. A light path length, in other words, a thickness of the filter layer is one of the factors that decide a characteristic of the color filter, and it is preferred that the thickness of the filter layer is even. When the color filter is manufactured by discharging liquid color filter material drops, it is preferred that a discharged area that is made to form the filter layer is filled up with the liquid color filter material without leaving any unfilled area.

Further, in a case of a color filter substrate that has a reflective part where an outside light is reflected and a transmissive part where an illumination light (a back light) is transmitted in a single pixel, a filter layer can be made by drying the liquid color filter material that is filled in the transmissive part and on the reflective part. However, there is a step at the border between the transmissive part and the reflective part because the transmissive part is an opening placed in the reflective part. A plane viewing angle of the transmissive part corresponds to a corner of a concave, and it is difficult to fill the corner with the liquid color filter material. Therefore, there can be a problem that a filter which has a shape following a shape of the transmissive part cannot be formed.

SUMMARY OF THE INVENTION

Aspects of the invention has been developed in consideration of the above-mentioned problem, and can provide a color filter substrate that is suitable for being appropriately applied with a liquid color filter material, a manufacturing method thereof, a display device, a liquid crystal display device and electronic equipment.

An exemplary color filter substrate of the invention can include a first layer having an opening, a reflective part, a transmissive part that is an opening of the reflective part and has an approximately elliptical shape and a filter layer that is placed on the opening and formed to cover the reflective part and the transmissive part.

A method of manufacturing a color filter substrate of the invention can include a step for forming a reflective part and a transmissive part that is an opening of the reflective part and has an approximately elliptical shape on a surface of a light transmittable member, a step for forming a first layer having a opening corresponding to the reflective part and the transmissive part, a step for applying a liquid color filter material inside the opening so as to cover the reflective part and the transmissive part; and a step for forming a filter layer by drying the applied liquid color filter material.

According to the above-described structure and method, because the transmissive part is approximately the elliptical shape, it does not have any corners which it is difficult to be filled with the color filter material, and the whole of the transmissive part can be filled with the liquid color filter material without leaving any unfilled parts.

In the color filter substrate, a second layer is preferably placed on the first layer. Since the discharged droplet (color filter material) tends to drop into the opening of the first layer, it makes easier to make the color filter substrate by using a discharging apparatus such as an ink-jet apparatus and the like.

In the color filter substrate, a surface of the reflective part is a light scattering surface. According to the above-mentioned structure, the color filter substrate with which the light reflected at the reflective part will not dazzle is obtained.

In the color filter substrate, a light transmittable substrate and a resin layer placed on the substrate and having a patterned indented surface are preferably included. And the reflective part can be formed on the patterned indented surface, such that the surface of the reflective part becomes the light scattering surface.

According to the above-mentioned structure, the light scattering surface can be easily formed on the surface of the reflective part.

In the color filter substrate, a water-shedding quality of the second layer against a liquid color filter material of the filter layer is preferably higher than that of the first layer. According to above-mentioned structure, when the color filter material is discharged from a discharging apparatus, such as an ink-jet apparatus, because the discharged color filter material hardly goes beyond the second layer, it does not flow out of the opening of the first layer and flows into the inside the opening. Consequently, application of the color filter material can be easily performed.

In the color filter substrate, the first layer preferably shows a lyophilic quality to the liquid color filter material. According to above-mentioned aspect, more even layer of the color filter material is formed within the opening of the first layer.

In the color filter substrate, the second layer is preferably a resist to pattern the first layer. According to above-mentioned structure, a process in which the resist is removed in order to form the second layer after the first layer is formed is not needed. As a result, a manufacturing time is shortened.

In the color filter substrate, more preferably, the resist can include a fluorinated polymer. According to above-mentioned structure, the resist shows a water-shedding quality to the color filter material without performing a surface quality modification process. Therefore, a plasma treatment is not necessary to be performed and it leads to shorten the manufacturing time.

In the color filter substrate, the first layer can preferably be a black matrix. According to above-mentioned structure, since light is obscured by the black matrix and it does not pass through a plurality of openings that are defined by the black matrix, it can prevent color mixture among pixels.

In the color filter substrate, an overcoat layer may be placed on the reflective part. And the filter layer covers the overcoat layer and the transmissive part. According to above-mentioned structure, a color purity of a reflected light can be lowered, and a difference between the color purity of a reflected light and a color purity of a transmitted light is made to be small. Consequently, a color appearance of a display using the reflected light and a color appearance of a display using the transmitted light are conformed.

The invention can be realized in various forms, such as a display having the above-described color filter substrate, a liquid crystal display device having a light source member, a liquid crystal layer and the color filter substrate placed between the light source member and the liquid crystal layer and electronic equipment having such liquid crystal display device.

In this specification, the display device can include a plasma display device, a liquid crystal display device, an electro-luminescence display device, a display device using an electron emission element, such as a field emission display (FED) and a surface conduction electron emitter display (SED), and the like.

BRIEF DESCRIPTION OF THE DRAWINGS

This invention will be described with reference to the accompanying drawings, wherein like numerals reference like elements, and wherein:

FIGS. 8(a) through (d) show a frame format of a manufacturing method for a base substrate of the first exemplary embodiment;

FIG. 20 is a view showing a frame format of a portable information processor of the third exemplary embodiment; and FIGS. 21(a) and (b) show a frame format of a shape of a transmissive part.

DETAILED DESCRIPTION OF PREFERRED EMBODIMENTS

Taking a case in which the invention is applied to a liquid crystal display device for example, the invention is described below with reference to figures. Exemplary embodiments described below shall not limit an invention which is described in claims. Also, all of components described in the embodiments below are not always essential as a solution for the invention described in claims.

Figure 1:
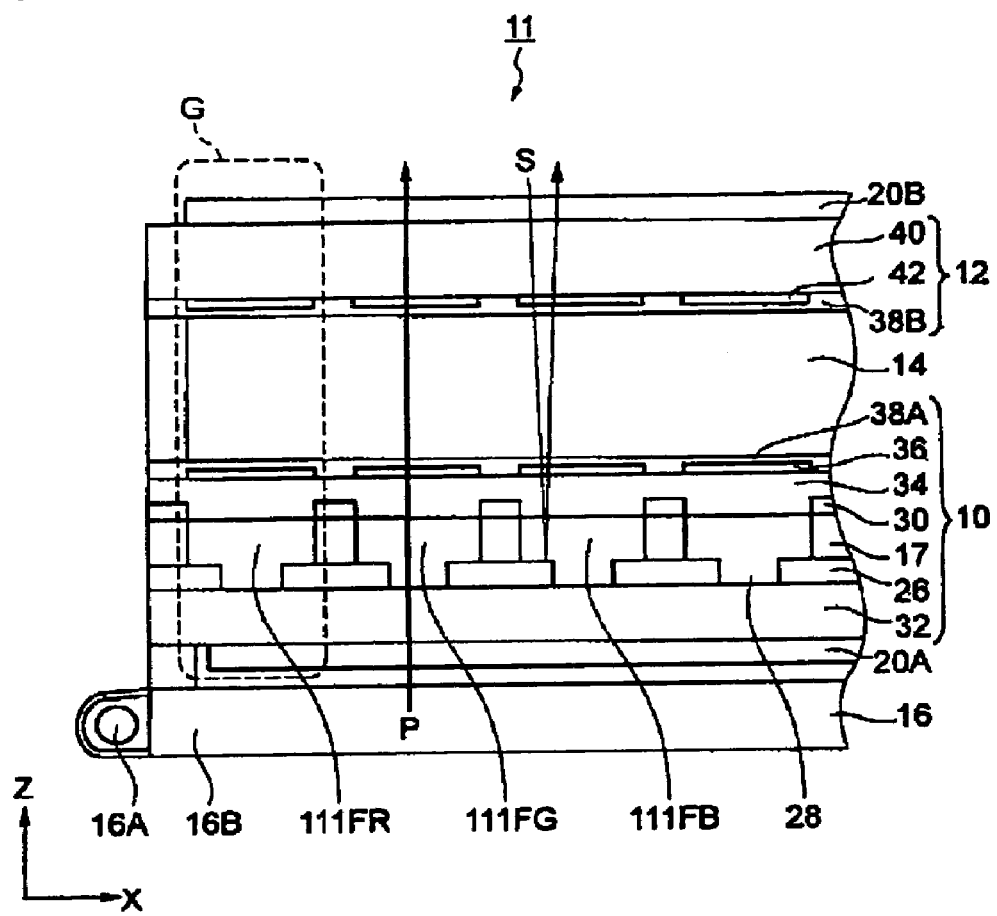
FIG. 1 shows a frame format of a liquid crystal display device of a first exemplary embodiment.

A liquid crystal display device 11 shown in FIG. 1 is a display having a two-terminal element Thin Film Diode (TFD) as a switching element. The liquid crystal display device 11 has a polarization plate 20A, a polarization plate 20B, a color filter substrate 10, a counter substrate 12, a liquid crystal layer 14 and a light source member 16. The liquid crystal layer 14 is placed between the color filter substrate 10 and the counter substrate 12. The color filter substrate 10 is placed between the liquid crystal layer 14 and the light source member 16. The color filter substrate 10, the liquid crystal layer 14 and the counter substrate 12 are located between the polarization plate 20A and the polarization plate 20B.

The color filter substrate 10 can include a light transmittable substrate 32, a reflective part 26, a transmissive part 28, and filter layers 111FR, 111FG and 111FB that are provided in the plural number. The color filter substrate 10 also includes a black matrix 17, a bank 30, a planarizing layer 34, a light transmittable electrode 36 that is provided in the plural number and an alignment film 38A. In this exemplary embodiment, the substrate 32 is located between the polarization plate 20A and the reflective part 26 or the transmissive part 28. The light transmittable substrate 32 is an example of a light transmittable member of the invention.

The polarization plate 20A is placed to nearly cover the whole surface of the substrate 32. In this exemplary embodiment, though the polarization plate 20A contacts with the substrate 32, the polarization plate 20A and the substrate 32 can be separated.

Both the reflective part 26 and the transmissive part 28 are located on the substrate 32. Both the reflective part 26 and the transmissive part 28 are placed in an area corresponding to each of filter layers 111FR, 111FG and 111FB. In this exemplary embodiment, the reflective part 26 and the transmissive part 28 are an aluminum film formed on the substrate 32 and its opening part, respectively.

The black matrix 17 has an opening 17A that is provided in the plural number. To be more specific, the black matrix 17 is a light shielding part that has a shape defining the opening 17A. A plurality of the openings 17A are provided in matrix and each opening 17A corresponds to a pixel region G that is described later. The black matrix 17 is formed on an each part of the reflective part 26. The black matrix 17 is an example of a first layer of the invention.

Each of the filter layers 111FR, 111FG and 111FB corresponds to one of three colors. In particular, the filter layer 111FR corresponds to red, the filter layer 111FG corresponds to green and the filter layer 111FB corresponds to blue. Each of the filter layers 111FR, 111FG and 111FB is located each of openings 17A respectively.

The bank 30 is formed on the black matrix 17. A planar shape of the bank 30 is the same planar shape of the black matrix 17. As described in detail later, a water-shedding quality of the bank 30 against the liquid color filter material for forming the filter layers 111FR, 111FG and 111FB is higher than that of the black matrix 17 against the color filter material. The bank 30 is an example of a second layer of the invention.

The planarizing layer 34 is located to cover the filter layers 111FR, 111FG and 111FB and the bank 30. To be more specific, the planarizing layer 34 covers a step formed by the filter layers 111FR, 111FG and 111FB and the bank 30 so as to obtain a substantially flat surface. A plurality of electrodes 36 can be located on the planarizing layer 34. Each electrode 36 has a stripe shape that extends in a Y-axis direction (direction perpendicular to the page of FIG. 1(*a*)) and the electrode runs parallel each other. The alignment film 38A is placed to cover the plurality of electrodes 36 and the planarizing layer 34, and a rubbing treatment in a certain direction is performed.

The counter substrate 12 includes a light transmittable substrate 40 and a light transmittable electrode 42 that can be provided in the plural number and an alignment film 38B. The substrate 40 is located between the polarization plate 20B and the electrodes 42. The polarization plate 20B is placed to nearly cover the whole surface of the substrate 40. In this embodiment, though the polarization plate 20B contacts with the substrate 40, the polarization plate 20B and the substrate 40 can be separated. Though it is not shown in FIG. 1, the counter substrate 12 has a two-terminal element that is electrically coupled to the electrode 42 and provided in a plural number.

A plurality of the electrodes 42 can be provided in matrix. The alignment film 38B is placed to cover the plurality of electrodes 42 and the substrate 40, and a rubbing treatment in a certain direction is performed. In this exemplary embodiment, the rubbing direction of the alignment film 38B and that of the alignment film 38A are set such that a liquid crystal is aligned in a Twisted Nematic (TN) alignment between the alignment film 38A and the alignment film 38B.

The liquid crystal layer 14 can be placed between the color filter substrate 10 and the counter substrate 12. In particular, the liquid crystal layer 14 is located in a space that is secured by spacers provided between the alignment film 38A and the alignment film 38B, and contacts with the alignment film 38A and the alignment film 38B.

A part where the electrode 36 overlaps the electrode 42 corresponds to the pixel region G.

The single pixel region G also means a region where corresponds one of the filter layers 111FR, 111FG and 111FB.

The light source member 16 is provided in a way that the color filter substrate 10 is located between the light source member 16 and the liquid crystal layer 14. The light source member 16 of this embodiment is also called as a back light. The light source member 16 includes a light source 16A that emits a white light and a light guide member 16B. The light guide member 16B guides a light from light source 16A as diffusing it so as to evenly illuminate the substrate 32 from its back surface. The back surface of the substrate 32 is the opposite surface to a surface on which the filter layers 111FR, 111FG and 111FB, the black matrix 17, the reflective part 26 and the transmissive part 28. For this reason, for example, the position of the substrate 32 can be described as it is located between the filter layers 111FR, 111FG and 111FB and the light source member 16.

As described above, in the color filter substrate 10, the reflective part 26 and the transmissive part 28 are located corresponding to each of the filter layers 111FR, 111FG and 111FB. The liquid crystal display device 11 having such color filter substrate 10 works as described below.

When the back light (the light source member 16) is used, a light beam P from the back light travels through the polarization plate 20A and the substrate 32, and then passes through the transmissive part 28. The light beam passed through the transmissive part 28 enters into the filter layers 111FR, 111FG and 111FB, and then a light beam that has a correspondent wave length band is emitted from the filter layers 111FR, 111FG and 111FB. The light beam (a colored light) form the filter layers 111FR, 111FG and 111FB travels through the liquid crystal layer 14 and the counter substrate 12, and then it is emitted from the polarization plate 20B. At an emitting area of the polarization plate 20B, an intensity of the light beam form the back light is modulated according to a voltage applied between the electrode 36 and the electrode 42.

On the other hand, when outside light is used, a light beam S including the outside light travels through the polarization plate 20B and the counter substrate 12 and the liquid crystal layer 14, and enters into the corresponding filter layers 111FR, 111FG and 111FB. Out of the light beam traveled through the filter layers 111FR, 111FG and 111FB, a light beam that is reflected by the reflective part 26 passes again through the filter layers 111FR, 111FG and 111FB and then emitted as a correspondent colored light. Each of colored light again travels through the liquid crystal layer 14 and the counter substrate 12, and then it is emitted from the polarization plate 20B. At an emitting area of the polarization plate 20B, an intensity of the light beam including the outside light is modulated according to the voltage applied between the electrode 36 and the electrode 42.

With the above-described structure, a first light beam that enters form a first side of the black matrix 17 and travels through the correspondent filter layers 111FR, 111FG and 111FB is reflected to the first side by the reflective part 26. On the other hand, a second light beam that enters form a second side of the black matrix 17 is emitted to the first side through the transmissive part 28 and the correspondent filter layers 111FR, 111FG and 111FB. The first side of the black matrix 17 can mean a side on which the planarizing layer 34 and the liquid crystal layer 14 are located. In contrast, the second side of the black matrix 17 means a side on which the light source member 16 is located.

In this way, the liquid crystal display device 11 can display images making use of both the outside light and the light from the back light. The liquid crystal display device 11 having such function is called a transflective display device.

The filter layers 111FR, 111FG and 111FB in the color filter substrate 10 are formed by discharging the color filter material in the opening 17A of the black matrix 17 from a discharging apparatus, such as an ink-jet apparatus and the like.

In this embodiment, the color filter substrate 10 in which the filter layers 111FR, 111FG and 111FB have not been provided yet may be referred as a base substrate 10A. Also, in this exemplary embodiment, regions where each of filter layers 111FR, 111FG and 111FB are formed may be referred as discharged portions 18R, 18G and 18B, respectively. According to this description, in this embodiment, each concave portion which is surrounded by the bank 30, the black matrix 17, the reflective part 26 and the transmissive part 28 corresponds to each of the discharged portions 18R, 18G and 18B in the base substrate 10A.

In what follows, a manufacturing apparatus for manufacturing the liquid crystal display device 11 is described.

Figure 2:
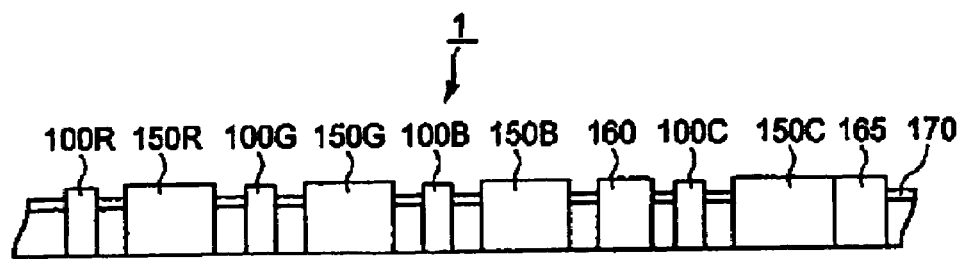
FIG. 2 is a view showing a frame format of a manufacturing apparatus of the first exemplary embodiment.

A manufacturing apparatus 1 shown in FIG. 2 is an apparatus to discharge a correspondent color filter material to each of discharged portions 18R, 18G and 18B of the base substrate 10A. To be more specific, the manufacturing apparatus 1 has a discharging device 100R that applies a color filter material 111R to the all discharged portions 18R and a drying device 150R that dries the color filter material 111R on the discharged portion 18R. The manufacturing apparatus 1 also has a discharging device 100G that applies a color filter material 111G to the all discharged portions 18G, a drying device 150G that dries the color filter material 111G on the discharged portion 18G, a discharging device 100B that applies a color filter material 111B to the all discharged portions 18B and a drying device 150B that dries the color filter material 111B on the discharged portion 18B. The manufacturing apparatus 1 further has an oven 160 in which the color filter materials 111R, 111G and 111B are heated again (post-bake), a discharging device 100C to form the planarizing layer 34 on a layer of post-baked color filter materials 111R, 111G and 111B, a drying device 150C that dries the planarizing layer 34 and a curing device 165 that heats the dried planarizing layer 34 again and hardens it. Further, the manufacturing apparatus 1 includes a carrier device 170 that carries the base substrate 10A to the discharging device 100R, the drying device 150R, the discharging device 100G, the drying device 150G, the discharging device 100B, the drying device 150B, the discharging device 100C, the drying device 150C and the curing device 165, in this order.

Figure 3:
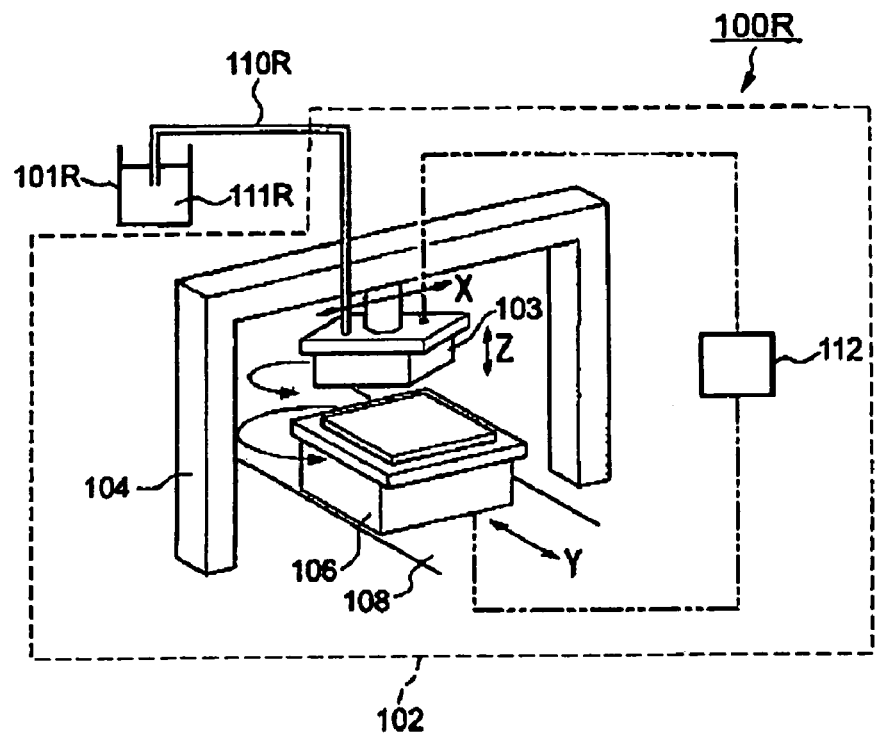
FIG. 3 is a view showing a frame format of a discharging apparatus.

As shown in FIG. 3, the discharging device 100R includes a tank 101R where the liquid color filter material 111R is stored and a discharging and scanning part 102 into which the color filter material 111R is provided from the tank 101R through a tube 110R. The discharging and scanning part 102 includes a carriage 103 that has a head 114 (FIG. 4) which can discharge the color filter material and is provided in a plural number and a first positioning control device 104 that controls the position of the carriage 103. The discharging and scanning part 102 also includes a stage 106 that holds the base substrate 10A, a second positioning control device 108 that controls the position of the stage 106 and a control member 112. The tank 101R and the heads 114 in the carriage 103 are coupled with the tube 110R, and the liquid color filter material 111R is provided to each of the heads 114 from the tank 101R by a pressure which is caused by a level difference between a liquid level of the color filter material 111R in the tank 101R and a level of a nozzle of a nozzle plate 128 which is described below.

The liquid color filter material 111R of this embodiment is an example of a liquid material of the invention. The liquid material means a material having a viscosity with which the material can be discharged from the nozzle. In this case, the material can be both water-based and oil-based material. It is enough to have liquidity (the viscosity) with which the material can be discharged from the nozzle, and it can even contains a solid matter as long as it can be taken as fluid as a whole.

The first positioning control device 104 has a linear motor and moves the carriage 103 along a X-axis direction and a Z-axis direction that is orthogonal to the X-axis direction according to a signal from the control member 112. The second positioning control device 108 has the linear motor and moves the stage 106 along a Y-axis direction that is orthogonal to the X-axis direction and the Z-axis direction according to a signal from the control member 112. The stage 106 has a plane that is parallel to both X-axis direction and the Y-axis direction, and the base substrate 10A is fixed on the plane. Since the stage 106 fixes the base substrate 10A, the stage 106 can decide the positions of the discharged portions 18R, 18G and 18B. The base substrate 10A of this exemplary embodiment is an example of a receiving substrate.

The first positioning control device 104 further has a function rotating the carriage 103 around a certain axis that is parallel to the Z-axis direction. The Z-axis direction refers a direction that is parallel to vertical direction (in other words, a direction of gravitational acceleration). An X-axis and a Y-axis in a coordinate system that is fixed on the receiving substrate can be parallelized to the X-axis direction and the Y-axis direction respectively by rotating the carriage 103 around the certain axis that is parallel to the Z-axis direction by the first positioning control device 104. In this exemplary embodiment, the X-axis direction and the Y-axis direction are directions in which the carriage moves relatively to the stage 106. In this specification, the first positioning control device 104 and the second positioning control device 108 may be referred as a scan unit.

The carriage 103 and the stage 106 further have a freedom degree of parallel transition and rotation other than the above-described ones. However, in this exemplary embodiment other freedom degree is not described in order to simplify the explanation.

The control member 112 is formed to accept a discharge data showing a relative position where the color filter material 111R should be discharged from an outside information processor. Detailed function of the control member 112 is described later.

Figure 4:
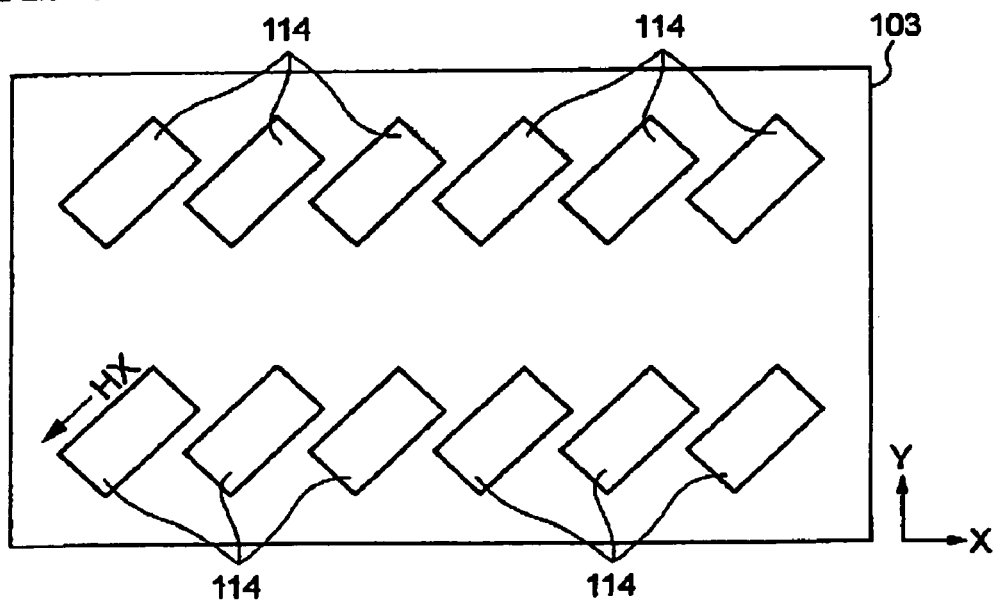
FIG. 4 is a view showing a frame format of a carriage of the first exemplary embodiment.

As shown in FIG. 4, the carriage 103 has the head 114 that is provided in the plural number and each head has the same structure. Here, FIG. 4 is a view of the carriage 103 that is looked from a side of the stage 106. Therefore, the orthogonal direction to the figure is the Z-axis direction. In this exemplary embodiment, six heads 114 consists a line and the two lines are provided in the carriage 103. Also, each head 114 is fixed in the carriage 103 such that a long side of the head 114 is placed at an angle AN to the X-axis direction.

Figure 5:
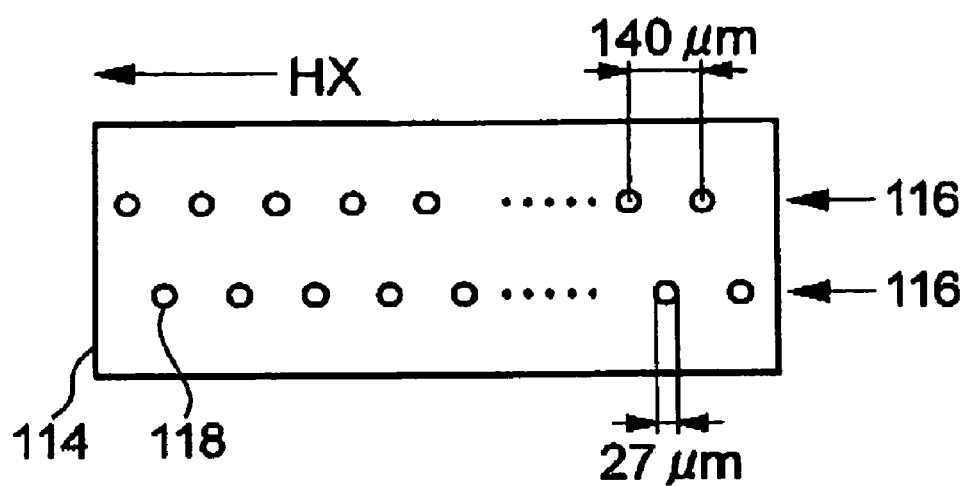
FIG. 5 is a view showing a frame format of a head of the first exemplary embodiment.

As shown in FIG. 5, the head 114 for discharging the color filter material 111R has two of a nozzle line 116 that extends in the long side direction of the head 114. The nozzle line 116 is a line in which 180 of nozzles 118 align. A distance between the nozzles 118 along a nozzle line direction HX is about 140 μm. In FIG. 5, the two nozzle lines 116 of the single head 114 are placed in a half pitch (about 70 μm) apart each other. Further, a diameter of the nozzle 118 is approximately 27 μm.

As described above, since the long side of the head 114 is placed at the angle AN to the X-axis direction, the nozzle line direction HX, in other words, a direction in which 180 nozzles 118 align is also placed at the angle AN to the X-axis direction. An edge of each nozzle 118 is located on a hypothetical plane that is defined by the above-described X-axis direction and the Y-axis direction. A shape of each nozzle 118 is adjusted such that the head 114 can discharge the material approximately parallel to the Z-axis.

The angle AN may be set in such a way as at least any two nozzles simultaneously correspond to some of the discharged portions 18R that align in the X-axis direction. In this way, two lines can be scanned and applied together in one scanning period. In this case, any two nozzles 118 may not be adjacent to each other.

Figure 6A:
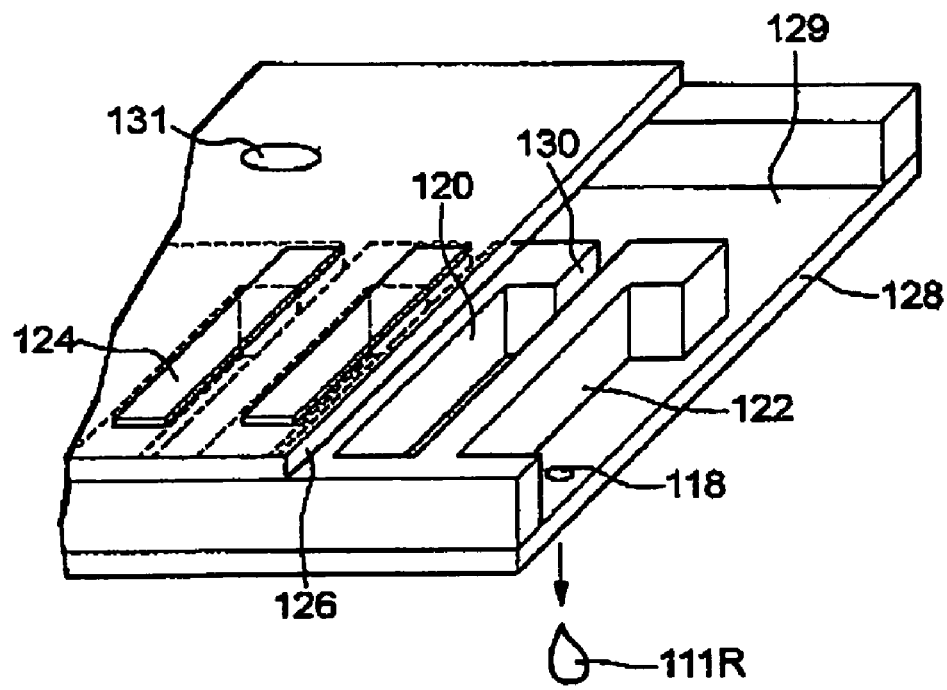
FIGS. 6(a) and (b) show a frame format of a discharging member in the head of the FIG. 5.
Figure 6B:
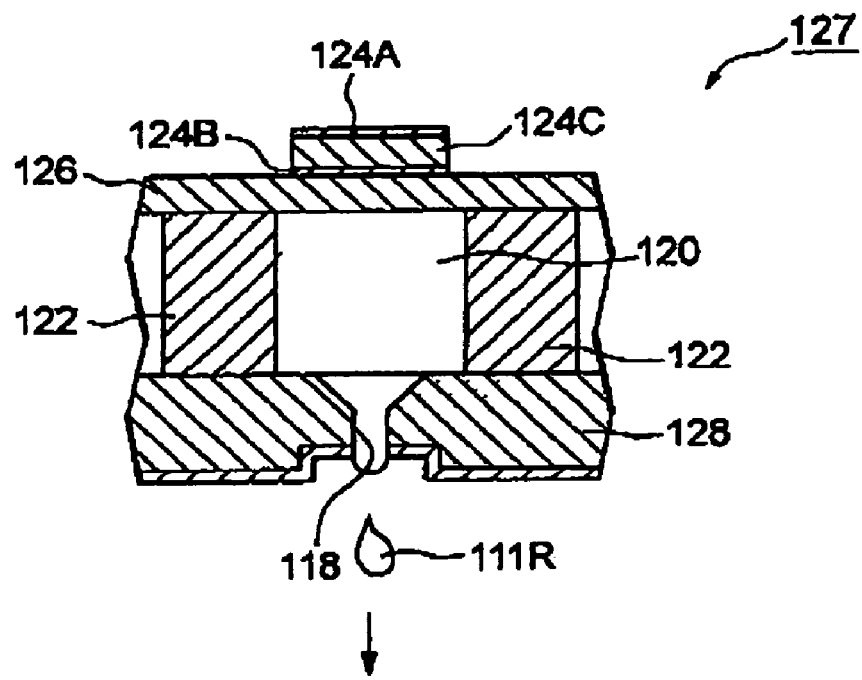

As shown in FIG. 6(a) and FIG. 6(b), each head 114 is an ink-jet head. More particularly, each head 114 has a vibrating board 126 and a nozzle plate 128. A store 129 is provided between the vibrating board 126 and the nozzle plate 128. The store 129 is always filled with the color filter material 111R that is provided from the tank 101R through an opening 131. A dividing wall 122 is located between the vibrating board 126 and the nozzle plate 128. The dividing wall 122 is provided in a plural number. And a part that is surrounded by the vibrating board 126, the nozzle plate 128 and a pair of the dividing walls 122 is a cavity 120. The number of the cavity 120 and the number of the nozzle 118 are same because the cavity 120 is provided corresponding to the nozzle 118. The color filter material 111R is provided into the cavity 120 from the store 129 through a feed opening 130 that is located between the pair of the dividing walls 122.

An oscillator 124 is provided on the vibrating board 126 corresponding to each cavity 120 and in a plural number. The oscillator 124 includes a piezoelectric element 124C, a pair of electrodes 124A and 124B that sandwiches the piezoelectric element 124C. The liquid color filter material 111R is discharged form the correspondent nozzle by applying the driving voltage to the pair of electrodes 124A and 124B.

The control member 112 (FIG. 3) is made to provide an independent signal to each of the oscillators 124. Therefore, a volume of the color filter material 111R that is discharged form the nozzle 118 is controlled by each nozzle 118 corresponding to the signal from the control member 112. Further, the volume of the color filter material 111R that is discharged form each nozzle 118 can be changed within a rage of 0-42 pl (pico-liter). Therefore, a nozzle 118 that discharges during the scan and the application and a nozzle 118 that does not discharge may be set.

In this specification, a part that includes the one nozzle 118, the cavity 120 corresponding to the nozzle 118 and the oscillator 124 corresponding to the cavity may be referred as a discharging member 127.

According to such description, the one head 114 has the same number of the discharging member 127 as that of the nozzle 118. Instead of the piezoelectric element, the discharging member 127 may have an electrothermal converting element. In other words, the discharging member may have a structure in which the material is discharged making use of a thermal expansion of the material with the electrothermal converting element.

As described above, the carriage 103 is moved in the X-axis direction and the Z-axis direction by the first positioning control device 104 (FIG. 3). On the other hand, the stage 106 (FIG. 3) is moved in the Y-axis direction by the second positioning control device 108 (FIG. 3). Consequently, the relative position of the head 114 against the stage 106 is changed by the first positioning control device 104 and the second positioning control device 108. To be more specific, the heads 114, the nozzle lines 116 and the nozzles 118 are relatively moved and scan in the X-axis direction and the Y-axis direction as they keep a certain distance from the discharged portions 18R that is fixed on the stage 106 in the Z-axis direction. More particularly, the head 114 discharges the material from the nozzles 118 as it relatively scans to the stage in the X-axis direction and the Y-axis direction. In the present invention, the nozzle 118 can scan the discharged portion 18R and the material can be discharged from the nozzle 118 onto the discharged portion 18R. A relative scan includes that one of a discharging side and a side at which the discharged material arrives (the discharged side 18R) is at least moved and scans the other side. Also, a combination of the relative scan and the discharge of the material may be referred as discharging scan.

Figure 7:
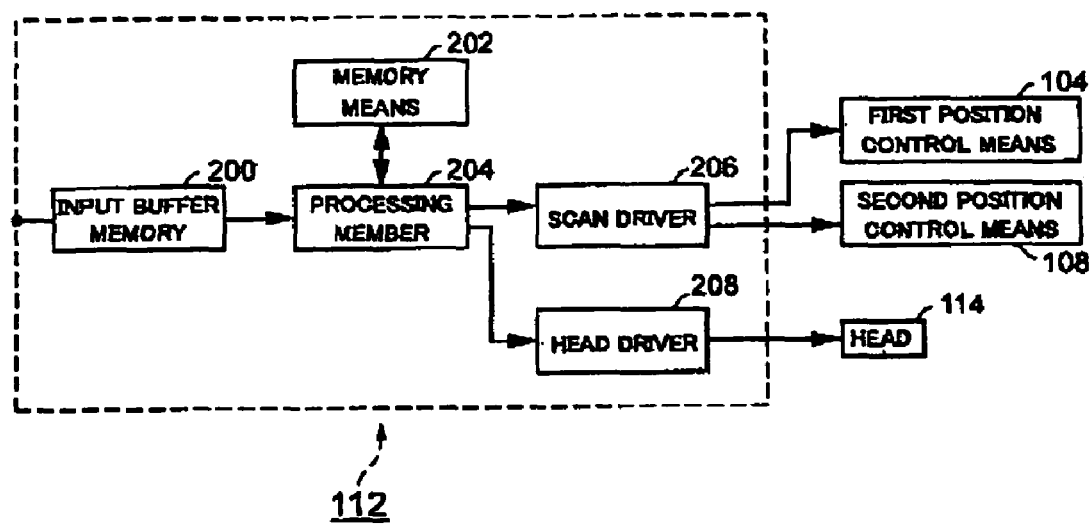
FIG. 7 is a functional block diagram of a control member in the discharging apparatus.

Next, a structure of the control member 112 is described. As shown in FIG. 7, the control member 112 has an input buffer memory 200, a memory device 202, a processing member 204, a scan driver 206 and a head driver 208. The input buffer memory 200 and the processing member 204 are coupled so as to communicate each other. The processing member 204 and the memory device 202 are coupled so as to communicate each other. The processing member 204 and the scan driver 206 are coupled so as to communicate each other. The processing member 204 and the head driver 208 are coupled so as to communicate each other. Also, the scan driver 206 is coupled to the first positioning control device 104 and the second positioning control device 108 so as to communicate each other. The head driver 208 is also coupled to each of heads 114 so as to communicate each other.

The input buffer memory 200 receives the discharge data for discharging the color filter material 111R from the outside information processor. The discharge data includes a data that shows relative positions of all the discharged portions 18R on the base substrate 10A and a data that shows a position where the material should be discharged or where the material should arrive. The discharge data also includes a data that shows a number of the relative scan which is required to apply the color filter material 111R in an intended thickness on all the discharged portions 18R and a data that specifies which nozzle to discharge the material and which nozzle to halt the discharging. The input buffer memory 200 provides the discharge data to the processing member 204. The processing member 204 stores the discharge data in the memory device 202. In FIG. 7, the memory means 202 is a random access memory (RAM).

The processing member 204 provides the scan driver 206 with a data that shows a relative position of the nozzle line 116 to the discharged portions 18R, based on the discharge data in the memory device 202. The scan driver 206 provides a driving signal according to this data to the first positioning control device 104 and the second positioning control device 108. Consequently, the nozzle line 116 is relatively moved against the discharged portions 18R. On the other hand, the processing member 204 provides the head driver 208 with a data that shows a timing of discharging from the correspondent nozzle 118, based on the discharge data stored in the memory device 202. Based on this data, the head driver 208 gives a driving signal which is necessary to discharge the color filter material 111R to the head 114. Accordingly, the liquid color filter material 111R is discharged form the corresponding nozzle 118 in the nozzle line 116.

The control member 112 may be a computer including a central processing unit (CPU), a read only memory (ROM) and a random access memory (RAM). In this case, the above-described function of the control member 112 is realized with a software program executed by computer. As a matter of course, the control member 112 can be made up with a special circuit (hardware).

With the above-described structure, the discharging device 100R scans and applies the color filter material 111R according to the discharge data given to the control member 112.

The above-mentioned description is the explanation for the structure of the discharging device 100R. The structure of the discharging device 10G, the structure of the discharging device 100B and the structure of the discharging device 100C are essentially same as that of the discharging device 100R. Except the discharging device 100G is different form the discharging device 100R in that it has a tank for the color filter material 111G instead of the tank 101R of the discharging device 100R. In a similar way, the discharging device 100B is different form the discharging device 100R in that it has a tank for the color filter material 111B instead of the tank 101R. Furthermore, the discharging device 100C is different form the discharging device 100R in that it has a tank for a protective film material instead of the tank 101R.

Next, a manufacturing method for the liquid crystal display device 11 is described.

Firstly, the reflective part 26 and the transmissive part 28 which is the opening in the reflective part 26 are formed on a surface of a light transmittable material. More particularly, as shown in FIG. 8(a), an aluminum (Al) film is formed on the light transmittable substrate 32 such as a glass substrate so as to almost cover the whole surface of the substrate by sputtering and the like. Here, the substrate 32 corresponds to the light transmittable member. Then, as shown in FIG. 8(b), the Al film is patterned so as to form the reflective part 26 and the transmissive part 28 in each pixel region G. To be more specific, the Al film is patterned in such a way that a shape of the transmissive part 28 becomes approximately an elliptical shape. A remaining Al film on the substrate 32 is the reflective part 26 and an area where the Al film is removed is the transmissive part 28 after the patterning. In this way, the reflective part 26 and the transmissive part 28 which is the opening in the reflective part 26 are formed on the surface of the light transmittable material.

In this exemplary embodiment, as shown in detail in FIG. 21(b), a plane view shape of the transmissive part 28 is approximately the elliptical shape when the transmissive part 28 is located on a virtual plane that is parallel to the X-axis direction and the Y-axis direction. More particularly, the transmissive part 28 is made to be approximately the elliptical shape (a track shape) which is consisted of a pair of straight lines and a pair of semicircles by patterning the Al film. The elliptical shape in this specification includes not only ellipse but also the track shape and an oval shape. As mentioned before, the X-axis direction and the Y-axis direction are the direction in which the nozzle 118 moves relatively to the discharged portion.

In this exemplary embodiment, the reflective part 26 is directly formed on the substrate 32. However, other layer such as a protective film may be formed between the substrate 32 and the reflective part 26. In this specification, the substrate 32 may include such layer as the protection film.

Next, a first material layer is formed so as to cover the reflective part 26 and the transmissive part 28. To be more specific, as shown in FIG. 8(c), a thermosetting acrylic resin in which black pigments are diffused (resin black) is applied in 3 µm thick to cover the reflective part 26 and the substrate 32. As a result, a resin black layer 17' is obtained. Here, the resin black layer 17' is an example of the above-mentioned first material layer.

Then, a second material layer is formed by applying resist on the first material layer. More particularly, as shown in FIG. 8(c), a negative acrylic chemical amplification type photosensitive resist in which a fluorinated polymer is blended is applied to cover the whole surface of the resin black layer 17'.

Consequently, a resist layer 30' is obtained on the resin black layer 17'. Here, the resist layer 30' is an example of the above-mentioned "second material layer."

Next, the resist layer 30' and the resin black layer 17' are patterned. To be more specific, the resist layer 30' is exposed to a light hv through a photomask that has a light shielding part corresponding to where the pixel region G is. Then, unexposed parts to the light hv, in other words, many parts of the resist layer 30' and the resin black layer 17' corresponding to where a plurality of the pixel regions G are, are removed by etching with a certain etchant. In this way, the bank 30 and the black matrix 17 that have a shape surrounding the filter layer which should be formed later are obtained at the same time as shown in FIG. 8(d). Stated another way, the opening 17A corresponding to the reflective part 26 and the transmissive part 28 is obtained.

As described above, areas which are surrounded or defined by the black matrix 17, the bank 30, the reflective part 26 and the transmissive part 28 are the discharged portions 18R, 18G and 18B. The bank 30 is light transmissible. Also, as mentioned above, the black matrix 17 is an example of a first layer of the invention, and the bank 30 is an example of a second layer of the invention.

In this manner, the area that is defined by the black matrix 17 and the bank 30 (in other words, the discharged portions 18R, 18G and 18B) is provided on the base substrate 10A by forming the black matrix 17 and the bank 30 located on the black matrix 17.

Next, a discharge method in which the discharging device 100R discharges the color filter material 111R on the discharged portions 18R is described.

Figure 9:
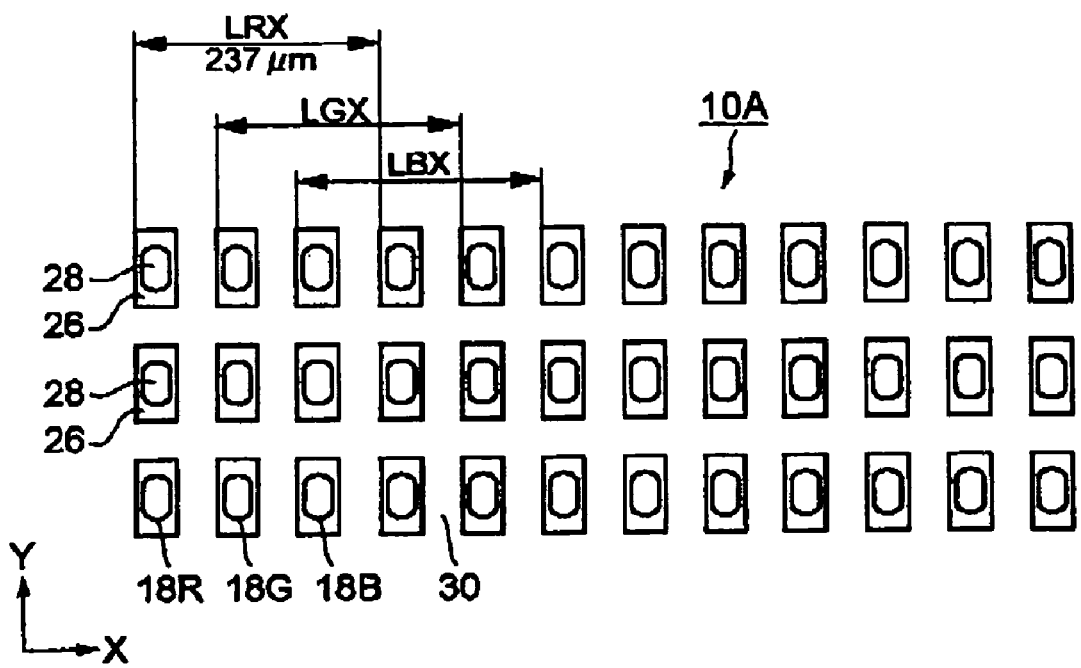
FIG. 9 is a view showing a frame format of a discharged portion of the first exemplary embodiment.

In the base substrate 10A shown in FIG. 9, rows and columns of the matrix which is consisted of the plurality of the discharged portions 18R, 18G and 18B are parallel to the X-axis direction and the Y-axis direction respectively. More particularly, the discharged portions 18R, the discharged portions 18G and the discharged portions 18B periodically align in the X-axis direction in this order. In contrast, the discharged portions 18R align in the Y-axis direction at regular intervals, the discharged portions 18G align in the Y-axis direction at regular intervals and the discharged portions 18B align in the Y-axis direction at regular intervals.

An interval LRX between two discharged portions 18R along the X-axis direction is approximately 237 µm. The interval LRX is the same as an interval LGX between two discharged portions 18G along the X-axis direction and an interval LBX between two discharged portions 18B along the X-axis direction. Also, X-axis lengths and Y-axis lengths of each discharged portions 18R, 18G and 18B are approximately 50 µm and 120 µm, respectively.

In this exemplary embodiment, in the discharged portion 18R, the transmissive part 28 is dented compared with the reflective part 26 and which forms the step in the discharged portion 18R (FIG. 8(d)). More particularly, the step is located at the border between the reflective part 26 and the transmissive part 28. This is because the transmissive part 28 is the opening of the reflective part 26 and formed by removing the part of the reflective part 26. Therefore, a size of the step is relevant to a thickness of the reflective part 26. In the discharged portions 18G and 18B, the transmissive part 28 is similarly dented compared with the reflective part 26.

For a start, the carrier device 170 positions the base substrate 10A on the stage 106 of the discharging device 100R. To be more specific, it is fixed such as the rows and the columns of the matrix which is consisted of the plurality of the discharged portions 18R, 18G and 18B become parallel to the X-axis direction and the Y-axis direction.

Figure 10:
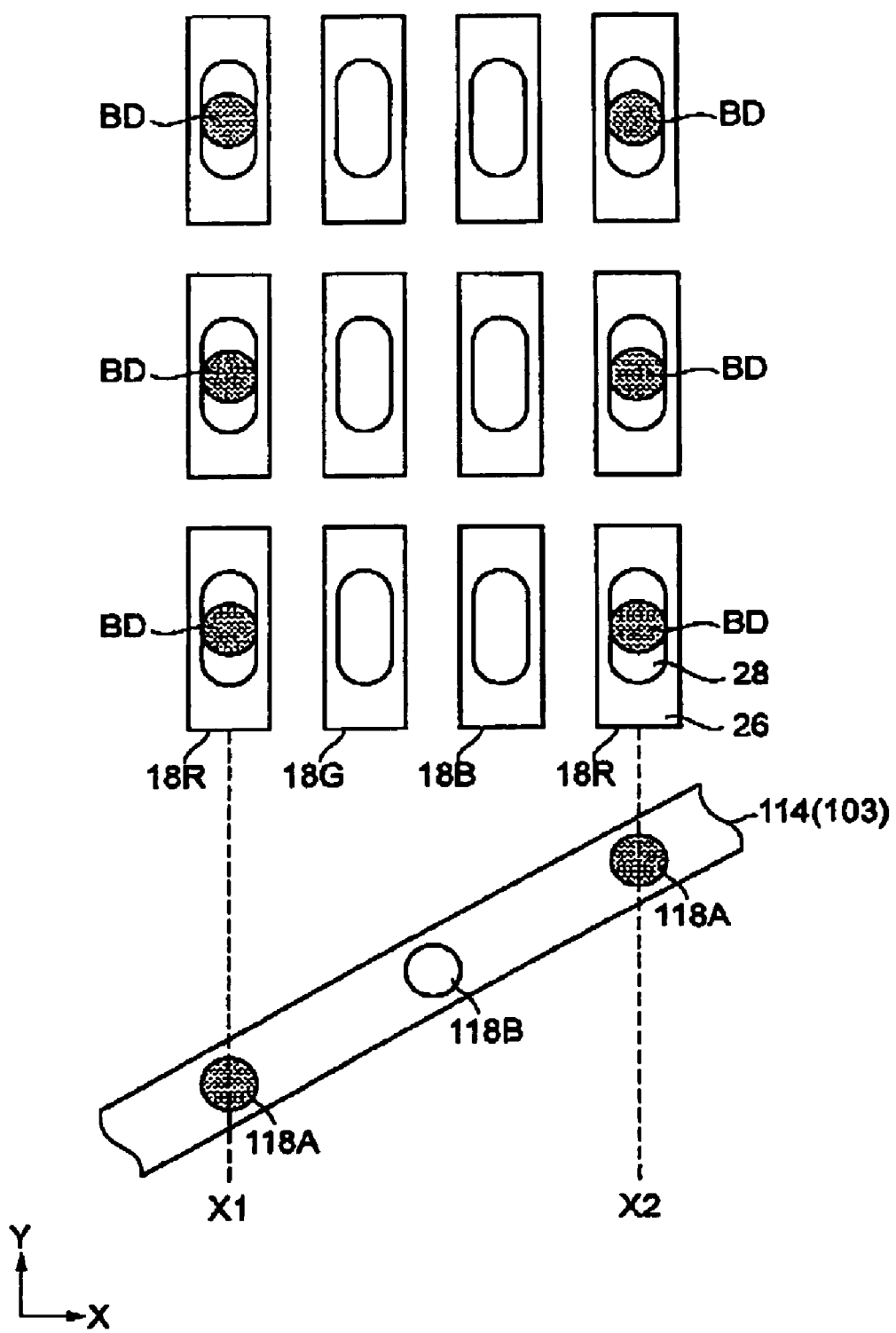
FIG. 10 is a view showing a frame format of a discharging method of the first exemplary embodiment.

Before a first scanning period starts, the discharging device 100R brings an x-coordinate of the nozzles 118 into line with an x-coordinate of the discharged portions 18R. More particularly, an x-coordinate of the most left nozzle 118 of the nozzles 118 shown in FIG. 10 is brought into line with an x-coordinate X1 of the most left discharged portion 18R of the discharged portions 18R shown in FIG. 10. At the same time, an x-coordinate of the most right nozzle 118 of the nozzles 118 shown in FIG. 10 is brought into line with an x-coordinate X2 of the most right discharged portion 18R of the discharged portions 18R shown in FIG. 10. Hereinafter, the nozzle 118 that corresponds to the discharged portions 18R can be written as a first nozzle 118A. Also, the nozzle 118 that does not correspond to the discharged portions 18R can be written as a second nozzle 118B.

Figure 13:
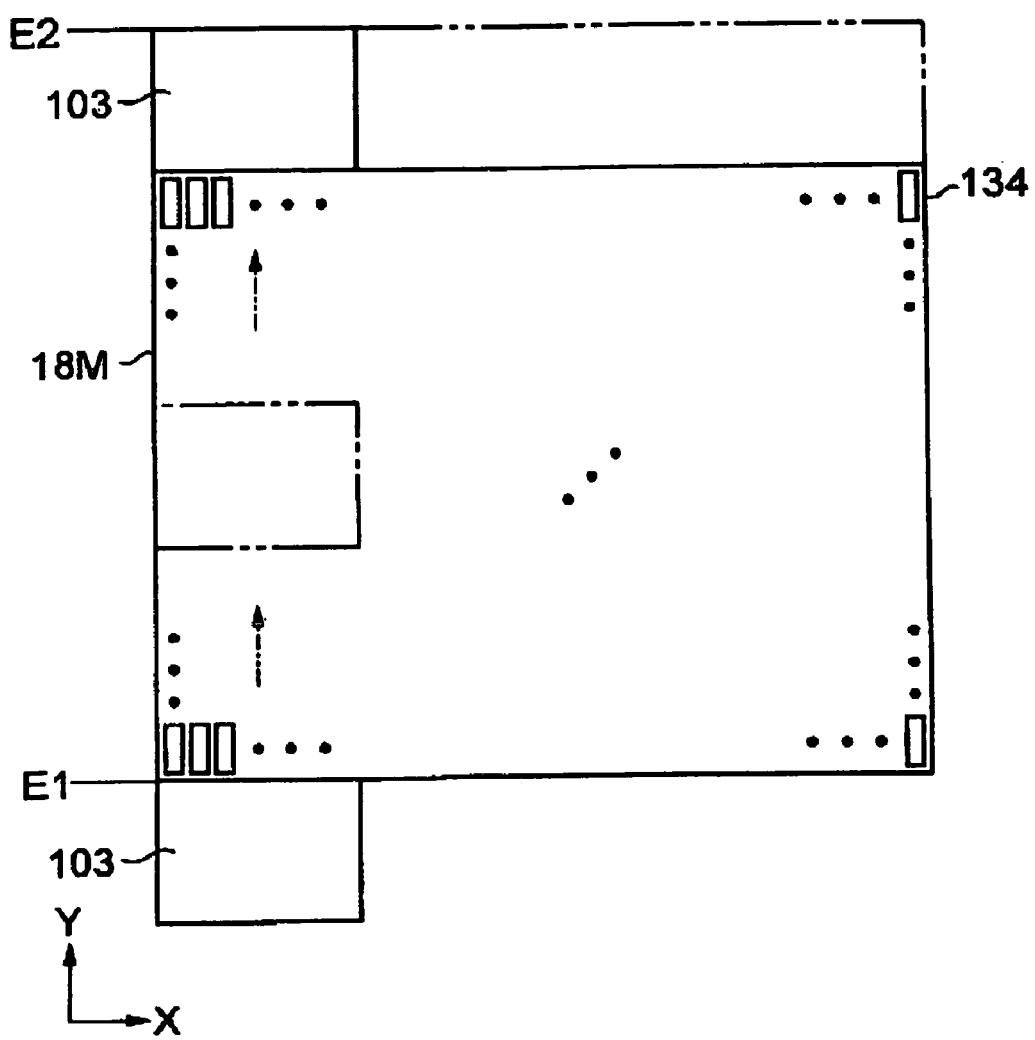
FIG. 13 is a view showing a frame format of a scan field of the first exemplary embodiment.

In this exemplary embodiment, the scanning period can mean a period in which an one side of the carriage 103 moves relatively once along the Y-axis direction from one end E1 (or the other end E2) of a scan field 134 to the other end E2 (or the one end E1) of the scan field 134 in order to apply the material on all the discharged portions 18R that align in the Y-axis direction, as shown in FIG. 13. In addition, in this embodiment, the scan field 134 can mean an area where the one side of the carriage 103 moves to apply the color filter material 111R on all the discharged portions 18R included in a matrix 18M. However, in some cases, the word scan field can refer an area where one nozzle 118 moves relatively, an area where one nozzle line 116 moves relatively or an area where one head 114 moves relatively. The matrix 18M is a matrix which the discharged portions 18R, 18G and 18B consist.

The carriage 103, the head 114 or the nozzle 118 moves relatively means that these relative position change against the discharged portions 18R. Therefore, even when the carriage 103, the head 114 or the nozzle 118 absolutely remains stationary and only the discharged portions 18R move by the stage 106, this is described as the carriage 103, the head 114 or the nozzle 118 moves relatively.

As shown in FIG. 10, when the first scanning period starts, the one side of the carriage 103 starts to move relatively from the one end E1 of the scan field 134 to an positive direction of the Y-axis (upward in the figure). Then, during the first scanning period, when the first nozzle 118A moves into a region that corresponds to the discharged portion 18R, the color filter material 111R is discharged to the correspondent discharged portion 18R from the first nozzle 118A. To be more specific, when the first nozzle 118A moves into a region that corresponds to the transmissive part 28 in the discharged portion 18R, the nozzle 118A discharges the color filter material 111R. In an example shown in FIG. 10, during the first scanning period, the color filter material 111R is discharge once to each discharged portion 18R. In FIG. 10, a position where the nozzle 118A discharges the color filter material 111R or a landing position BD is indicated by a black circle.

Figure 11:
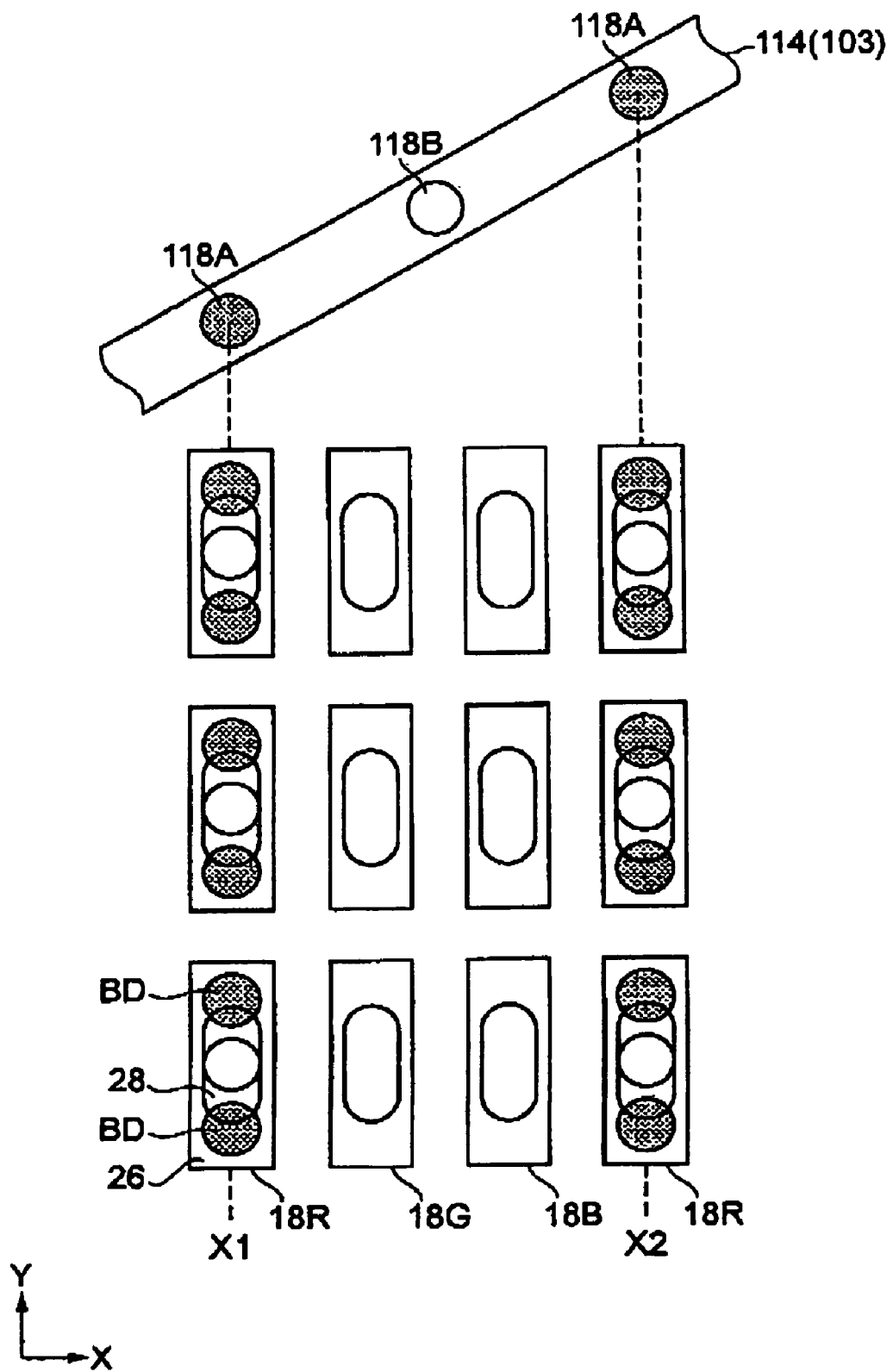
FIG. 11 is a view showing a frame format of the discharging method of the first exemplary embodiment.
Figure 12A:
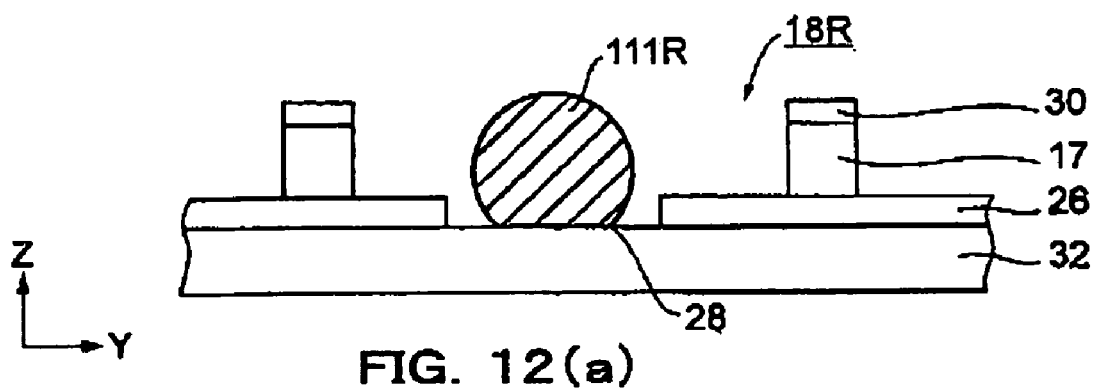
FIGS. 12(a) through (d) shows a frame format of the discharging method of the first exemplary embodiment.
Figure 12B:
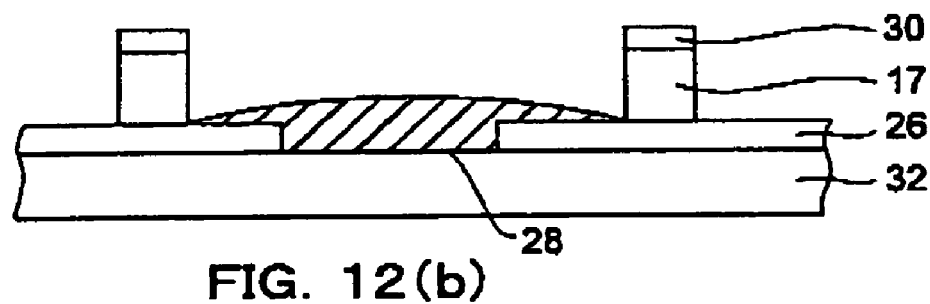
Figure 12C:
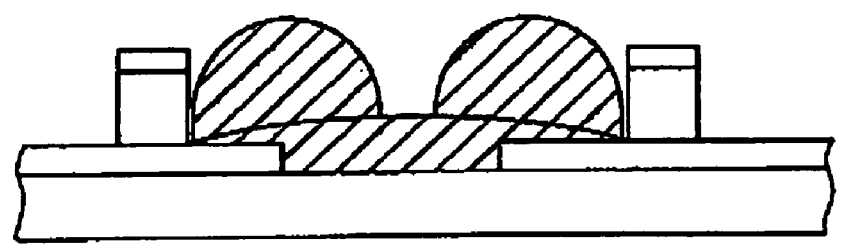
Figure 12D:
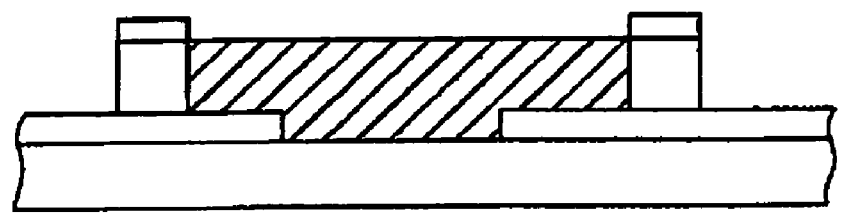

As shown in FIG. 11, when a second scanning period that consecutively follows after the first scanning period starts, the carriage 103 starts to move relatively from the other end E2 of the scan field 134 to an negative direction of the Y-axis (downward in the figure). Then, during the second scanning period, when the first nozzle 118A moves into a region that corresponds to the discharged portion 18R, the color filter material 111R is discharged to the correspondent discharged portion 18R from the first nozzle 118A. To be more specific, when the first nozzle 118A moves into a region that corresponds to the reflective part 26 in the discharged portion 18R, the nozzle 118A discharges the color filter material 111R. In an example shown in FIG. 11, during the second scanning period, the color filter material 111R is discharge twice to each discharged portion 18R. In FIG. 11, a position where the nozzle 118A discharges the color filter material 111R or a landing position BD is indicated by a black circle. The position where the color filter material 111R was discharged during the first scanning period is also indicated by a white circle in FIG. 11.

Then, the discharging device 100R moves an x-coordinate of the carriage 103 step by step and discharges the color filter material 111R to all the discharged portions 18R in the base substrate 10A in the above-described way.

Focusing only on a single discharged portion 18R, the above discharging method is described with reference to FIG. 12.

FIG. 12 is a Y-Z cross-section view of the discharged portion 18R. A horizontal direction of the page of FIG. 12 is a long side of the discharged portion 18R. As shown in FIG. 12(a), the color filter material 111R is discharged to the transmissive part 28 during the first scanning period. As shown in FIG. 12(b), when the color filter material 111R arrives at the transmissive part 28, the color filter material 111R spreads to cover not only the transmissive part 28 but also the step locating at the border between the reflective part 26 and the transmissive part 28. During the second scanning period, the color filter material 111R is discharged to the area that approximately corresponds to the reflective part 26 as shown in FIG. 12(c). In this case, some droplet of the color filter material 111R may arrive to overlap the transmissive part 28. Then, as shown in FIG. 12(d), a solvent is evaporated from the color filter material 111R that is discharged during the first scanning period and the second scanning period, and a layer of the color filter material 111R is formed in the discharged portion 18R. The layer shown in FIG. 12(d) is further dried, and then the filter layer 111FR is obtained.

The above-mentioned description is the explanation of the discharge method in which the discharging device 100R discharges the color filter material 111R to the discharged portion 18R. Hereinafter, a series of manufacturing method in which the color filter substrate 10 is manufactured by the manufacturing apparatus 1.

Figure 14A:
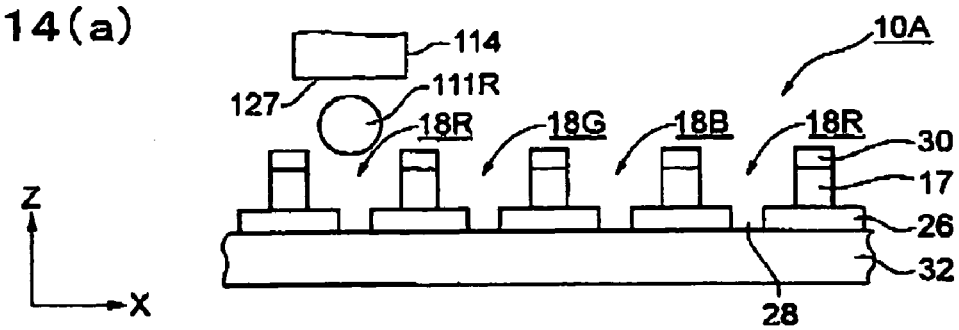
FIGS. 14(a) through (d) shows a frame format of a manufacturing method of the first exemplary embodiment.

The base substrate 10A on which the discharged portions 18R, 18G and 18B are formed is carried by the carrier device 170 to the stage 106 of the discharging device 100R. Then, as shown in FIG. 14(a), the discharging device 100R discharges the color filter material 111R from the discharging member 127 in the head 114 so as to form the layer of the color filter material 111R on all the discharged portions 18R. A method in which the discharging device 100R discharges the color filter material 111R is the same as the way described above with reference to FIGS. 10, 11 and 12. After the layer of the color filter material 111R is formed on all the discharged portions 18R of the base substrate 10A, the carrier device 170 puts the base substrate 10A within the drying device 150R. Then, the filter layer 111FR is obtained on the discharged portions 18R by completely drying the color filter material 111R on the discharged portions 18R.

Figure 14B:
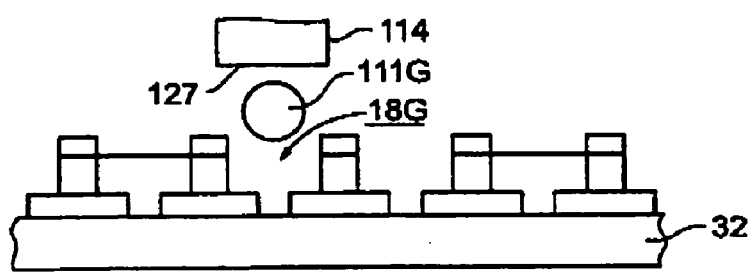
Figure 14C:
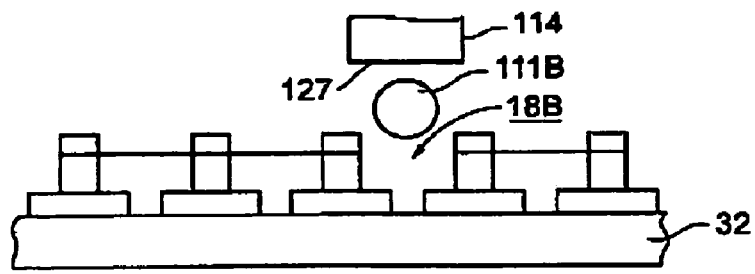

Next, the carrier device 170 puts the base substrate 10A on the stage 106 of the discharging device 100G. Then, as shown in FIG. 14(b), the discharging device 100G discharges the color filter material 111G from the discharging member 127 in the head 114 so as to form the layer of the color filter material 111G on all the discharged portions 18G. A method in which the discharging device 100G discharges the color filter material 111G is the same as the way described above with reference to FIGS. 10, 11 and 12. After the layer of the color filter material 111G is formed on all the discharged portions 18G of the base substrate 10A, the carrier device 170 puts the base substrate 10A within the drying device 150G. Then, the filter layer 111FG is obtained on the discharged portions 18G by completely drying the color filter material 111G on the discharged portions 18G.

Next, the carrier device 170 puts the base substrate 10A on the stage 106 of the discharging device 100B. Then, as shown in FIG. 14(b), the discharging device 100B discharges the color filter material 111B from the discharging member 127 in the head 114 so as to form the layer of the color filter material 111B on all the discharged portions 18B. A method in which the discharging device 100B discharges the color filter material 111B is the same as the way described above with reference to FIGS. 10, 11 and 12. After the layer of the color filter material 111B is formed on all the discharged portions 18B of the base substrate 10A, the carrier device 170 puts the base substrate 10A within the drying device 150B. Then, the filter layer 111FB is obtained on the discharged portions 18B by completely drying the color filter material 111B on the discharged portions 18B.

As mentioned above, the transmissive part 28 is approximately the elliptical shape as shown in detail in FIG. 21(b). More particularly, the transmissive part 28 is approximately the elliptical shape (a track shape) which is consisted of a pair of straight lines and a pair of semicircles. Because the transmissive part 28 does not have any corners which it is difficult to be filled with the color filter materials 111R, 111G and 111B, the whole surface of the transmissive part 28 can be filled with the color filter materials 111R, 111G and 111B without leaving any unfilled parts. Therefore, when the color filter materials 111R, 111G and 111B are dried, the transmissive parts 28 are covered with the filter layers 111FR, 111FG and 111FB without leaving any space between.

In this exemplary embodiment, the bank 30 has the water-shedding quality against the color filter materials 111R, 111G and 111B. Further, the water-shedding quality of the black matrix 17 against the color filter materials 111R, 111G and 111B is lower than that of the bank 30 against the color filter materials 111R, 111G and 111B. The black matrix 17 rather shows a lyophilic quality to the color filter materials 111R, 111G and 111B. The reason for this is that the fluorinated polymer is blended in the bank 30. In contrast, the black matrix 17 does not contain any fluorinated polymers. Generally, a surface of a resin that contains the fluorinated polymer shows a higher water-shedding quality against a carrier fluid that is contained in the liquid color filter materials compared with a surface of a resin that does not contain the fluorinated polymer. In contrast, many resins that do not contain fluorine show the lyophilic quality to the above-mentioned liquid materials.

According to this exemplary embodiment, since the bank 30 shows the relatively high water-shedding quality, the color filter materials droplets that have just arrived at the discharged portions 18R, 18G and 18B flow out to the black matrix 17 without going beyond the bank 30 and without flowing out of the discharged portions 18R, 18G and 18B.

Further, since a layer that shows an intended water-shedding quality and a layer that shows an intended lyophilic quality are formed, a surface quality modification process to give the black matrix 17 or the bank 30 the water-shedding quality or the lyophilic quality is not necessary. For example, a plasma treatment and an oxygen plasma treatment using tetrafluoromethane as a treatment gas are not necessary to be performed.

Next, the carrier device 170 puts the base substrate 10A within the oven 160. Then, the filter layers 111FR, 111FG and 111FB are heated again (post-bake) in the oven 160.

Next, the carrier device 170 puts the base substrate 10A on the stage 106 of the discharging device 100C. The discharging device 100C discharges the liquid material so as to form the planarizing layer 34 covering the filter layers 111FR, 111FG and 111FB and the bank 30. After the planarizing layer 34 that covers the filter layers 111FR, 111FG and 111FB and the bank 30 is formed, the carrier device 170 puts the base substrate 10A within the oven 150C. Then the planarizing layer 34 is completely dried in the oven 150C, and then the curing device 165 heats the planarizing layer 34 and it gets hardened completely.

Figure 14D:
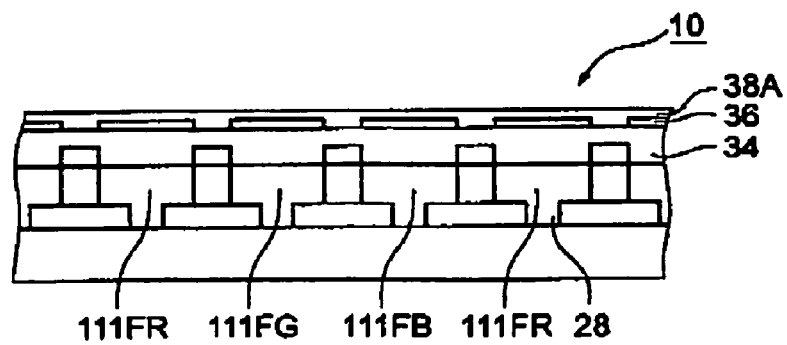

Then, the plurality of electrodes 36 are formed on the planarizing layer 34 and the alignment film 38A is formed to cover the plurality of electrodes 36 and the planarizing layer 34. Accordingly, the base substrate 10A becomes the color filter substrate 10 as shown in FIG. 14(d).

Next, the color filter substrate 10 and the counter substrate 12 that is made separately are sealed together in such way that the alignment film 38A opposes the alignment film 38B interposing the spacers therebetween. Then, a space between the two alignment films is filled with a liquid crystal material. After that, the polarization plate 20A and the polarization plate 20B are provided, and the light source member 16 is also provided. Finally, the liquid crystal display device 11 is obtained.

Figure 15:
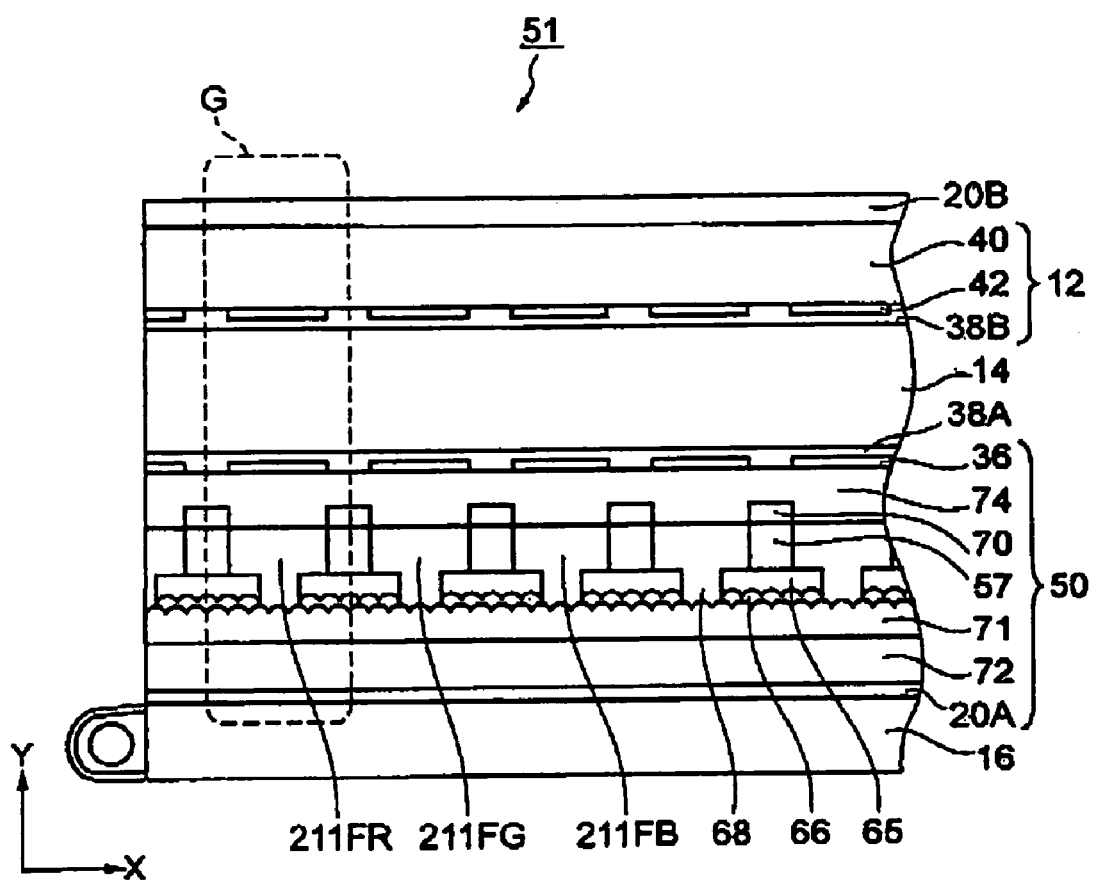
FIG. 15 shows a frame format of a liquid crystal display device of a second exemplary embodiment.

Structures of a liquid crystal display device 51 of a second exemplary embodiment is substantially the same as those of the liquid crystal display device 11 of the first exemplary embodiment except the color filter substrate 10 in the liquid crystal display device 11 of the first exemplary embodiment is replaced by a color filter substrate 50. In FIG. 15, the same components or elements as those described in the first exemplary embodiment are given the identical numerals and explanations that are overlaps with those of the first exemplary embodiment are omitted.

The liquid crystal display device 51 as shown in FIG. 15 has the polarization plate 20A, the polarization plate 20B, the color filter substrate 50, the counter substrate 12, the liquid crystal layer 14 and the light source member 16. The liquid crystal layer 14 is placed between the color filter substrate 50 and the counter substrate 12. The color filter substrate 50 is placed between the liquid crystal layer 14 and the light source member 16. The color filter substrate 50, the liquid crystal layer 14 and the counter substrate 12 are located between the polarization plate 20A and the polarization plate 20B.

The color filter substrate 50 can include a light transmittable substrate 72, a resin scattering layer 71, a reflective part 66, a transmissive part 68, an overcoat layer 65 and filter layers 211FR, 211FG and 211FB that are provided in the plural number. The color filter substrate 50 also includes a black matrix 57, a bank 70, a planarizing layer 74, the light transmittable electrode 36 that is provided in the plural number and the alignment film 38A. In this embodiment, the substrate 72 is located between the polarization plate 20A and the reflective part 66 or the transmissive part 68.

The resin scattering layer 71 is provided to cover the substrate 72. Further the reflective part 66 and the transmissive part 68 locate on the resin scattering layer 71. Both the reflective part 66 and the transmissive part 68 are placed in an area corresponding to each of filter layers 211FR, 211FG and 211FB. In this exemplary embodiment, the reflective part 66 and the transmissive part 68 are the aluminum film and its opening part, respectively.

A plane view shape of the transmissive part 68 is formed to be approximately the elliptical shape as shown in FIG. 21(b). More particularly, the transmissive part 68 is approximately the elliptical shape (the track shape) which is consisted of a pair of straight lines and a pair of semicircles. The track shape can be any shape as long as it is suitable to a plane view shape of an opening 57A that is defined by a shape of the black matrix 57. For example, it can be a circular form in which the pair of straight lines is omitted or a track shape that is consisted of two pairs of straight lines and two pairs of circular arc as long as the plane view shape of the opening 57A is close to square.

An irregular concavity and convexity is formed on the resin scattering layer 71. Consequently, a reflecting surface of the reflective part 66 formed on the resin scattering layer 71 also has the irregular concavity and convexity. The reflective part 66 has a function of reflecting light to a random direction because the reflecting surface has the irregular concavity and convexity.

The overcoat layer 65 is located on the reflective part 66. The overcoat layer 65 is patterned to be the same form as that of the reflective part 66. One purpose of providing the overcoat layer 65 is to lower a color purity of a reflected light.

The black matrix 57 is located on a part of the overcoat layer 65. The black matrix 57 has an opening 57A that is provided in the plural number. To be more specific, the black matrix 57 is a light shielding part that has a shape defining the opening 57A. A plurality of the openings 57A are provided in matrix and each opening 57A corresponds to the pixel region G. The black matrix 57 is an example of the first layer of the invention.

Each of the filter layers 211FR, 211FG and 211FB corresponds to one of the three colors. In particular, the filter layer 211FR corresponds to red, the filter layer 211FG corresponds to green and the filter layer 211FB corresponds to blue. Each of the filter layers 211FR, 211FG and 211FB is located each of openings 57A respectively.

The bank 70 is formed on the black matrix 57. A planar shape of the bank 70 is the same planar shape of the black matrix 57. As described in detail later, a water-shedding quality of the bank 70 against the liquid color filter material for forming the filter layers 211FR, 211FG and 211FB is higher than that of the black matrix 17 against the color filter material. The bank 70 is an example of the second layer of the invention.

The planarizing layer 74 is located to cover the filter layers 211FR, 211FG and 211FB and the bank 70. To be more specific, the planarizing layer 74 covers a step formed by the filter layers 211FR, 211FG and 211FB and the bank 70 so as to obtain a substantially flat surface. The plurality of electrodes 36 is located on the planarizing layer 74. Each electrode 36 has the stripe shape that extends in the Y-axis direction (direction perpendicular to the page of FIG. 15(a)) and the electrode runs parallel each other. The alignment film 38A is placed to cover the plurality of electrodes 36 and the planarizing layer 74, and the rubbing treatment in a certain direction is performed.

As described above, in the color filter substrate 50, the reflective part 66 and the transmissive part 68 are located corresponding to each of the filter layers 211FR, 211FG and 211FB. The liquid crystal display device 51 having such color filter substrate 50 works as described below.

When the back light (the light source member 16) is used, the light beam P from the back light travels through the polarization plate 20A and the substrate 72, and then passes through the transmissive part 68. The light beam passed through the transmissive part 68 enters into the filter layers 211FR, 211FG and 211FB, and then a light beam that has a correspondent wave length band is emitted from the filter layers 211FR, 211FG and 211FB. The light beam (the colored light) form the filter layers 211FR, 211FG and 211FB travels through the liquid crystal layer 14 and the counter substrate 12, and then it is emitted from the polarization plate 20B. At the emitting area of the polarization plate 20B, an intensity of the light beam form the back light is modulated according to the voltage applied between the electrode 36 and the electrode 42.

On the other hand, when outside light is used, the light beam S including the outside light travels through the polarization plate 20B and the counter substrate 12 and the liquid crystal layer 14, and enters into the corresponding filter layers 211FR, 211FG and 211FB. Out of the light beam traveled through the filter layers 211FR, 211FG and 211FB, a light beam that is reflected by the reflective part 66 passes again through the filter layers 211FR, 211FG and 211FB and then emitted as a correspondent colored light. Each of colored light again travels through the liquid crystal layer 14 and the counter substrate 12, and then it is emitted from the polarization plate 20B. At the emitting area of the polarization plate 20B, an intensity of the light beam including the outside light is modulated according to the voltage applied between the electrode 36 and the electrode 42.

With the above-described structure, a first light beam that enters form a first side of the black matrix 57 and travels through the correspondent filter layers 211FR, 211FG and 211FB is reflected to the first side by the reflective part 66. On the other hand, a second light beam that enters form a second side of the black matrix 57 is emitted to the first side through the transmissive part 68 and the correspondent filter layers 211FR, 211FG and 211FB. The first side of the black matrix 57 means a side on which the planarizing layer 74 and the liquid crystal layer 14 are located. In contrast, the second side of the black matrix 57 means a side on which the light source member 16 is located.

In this way, the liquid crystal display device 51 can display images making use of both the outside light and the light from the back light. The liquid crystal display device 51 having such function is called the transflective display device.

The filter layers 211FR, 211FG and 211FB in the color filter substrate 50 are formed by discharging the color filter material in the opening 57A of the black matrix 57 with the ink-jet apparatus and the like.

In this exemplary embodiment, the color filter substrate 50 in which the filter layers 211FR, 211FG and 211FB have not been provided yet may be referred as a base substrate 50A. Also, in this exemplary embodiment, regions where each of filter layers 211FR, 211FG and 211FB are formed may be referred as discharged portions 58R, 58G and 58B, respectively. According to this description, in this exemplary embodiment, each concave portion which is surrounded by the bank 70, the black matrix 57, the overcoat layer 65 and the transmissive part 68 corresponds to each of the discharged portions 58R, 58G and 58B in the base substrate 50A.

Next, a manufacturing method for the liquid crystal display device 51 is described.

Figure 16A:
FIGS. 16(a) through (e) show a frame format of a manufacturing method for a base substrate of the second exemplary embodiment.
Figure 16B:
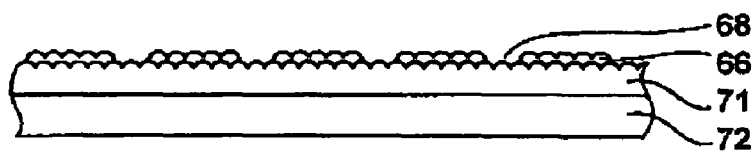
Figure 16C:

Firstly, the reflective part 66 and the transmissive part 68 which is the opening in the reflective part 66 are formed on a surface of a light transmittable material. More particularly, as shown in FIG. 16(a), a resin layer that is transmissible and made of polyimide and the like is formed on the light transmittable substrate 72 such as the glass substrate so as to almost cover the whole surface of the substrate by sputtering and the like. And then, a random concavity and convexity is given to a surface of the resin layer by a blast method. Consequently the resin scattering layer 71 is obtained. Here, the resin scattering layer 71 corresponds to the light transmittable member. Then, an aluminum (Al) film is formed on the resin scattering layer 71 by sputtering and the like. After that, as shown in FIG. 16(b), the Al film is patterned so as to form the reflective part 66 and the transmissive part 68 in each pixel region G. A remaining Al film on the resin scattering layer 71 is the reflective part 66 and an area where the Al film is removed is the transmissive part 68 after the patterning. In this way, the reflective part 66 and the transmissive part 68 are formed on the surface of the light transmittable material.

In this exemplary embodiment, as shown in detail in FIG. 21(b), a plane view shape of the transmissive part 68 is approximately the elliptical shape when the transmissive part 68 is located on a virtual plane that is parallel to the X-axis direction and the Y-axis direction. More particularly, the transmissive part 68 is made to be approximately the elliptical shape (the track shape) which is consisted of the pair of straight lines and the pair of semicircles by patterning the Al film. The elliptical shape in this specification includes not only ellipse but also the track shape and the oval shape. As mentioned before, the X-axis direction and the Y-axis direction are the direction in which the nozzle 118 moves relatively to the discharged portion.

Next, as shown in FIG. 16(b), the over coat layer can be applied so as to cover the reflective part 66 and the resin scattering layer 71 and patterned to be the same shape as that of the reflective part 66. As a result, the over coat layer 65 is obtained on the reflective part 66.

Figure 16D:
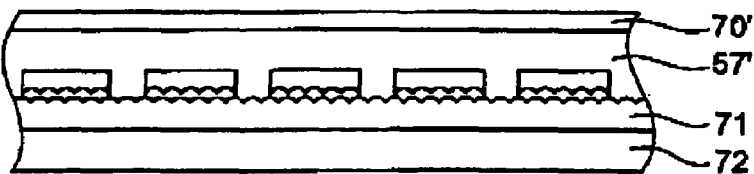

Next, a first material layer is formed so as to cover the reflective part 66 and the transmissive part 68. To be more specific, as shown in FIG. 16(d), the thermosetting acrylic resin in which black pigments are diffused (resin black) is applied in 3 μm thick to cover the overcoat layer 65 and the substrate 72 that is exposed between two overcoat layers 65 (in other words, between two reflective parts 66). As a result, a resin black layer 57' is formed. Here, the resin black layer 57' is an example of the above-mentioned first material layer.

Then, as shown in FIG. 16(b), a negative acrylic chemical amplification type photosensitive resist in which a fluorinated polymer is blended is applied to cover the whole surface of the resin black layer 57'.

Consequently, a resist layer 70' is obtained on the resin black layer 57'. Here, the resist layer 70' is an example of the above-mentioned second material layer.

Figure 16E:
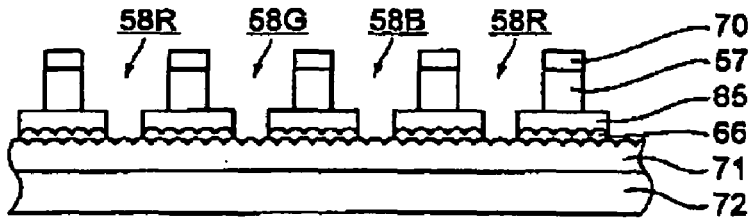

Next, the resist layer 70' and the resin black layer 57' are patterned. To be more specific, the resist layer 70' is exposed to the light hv through a photomask that has the light shielding part corresponding to where the pixel region G is. Then, unexposed parts to the light hv, in other words, many parts of the resist layer 70' and the resin black layer 57' corresponding to where the plurality of the pixel regions G are, are removed by etching with a certain etchant. In this way, the black matrix 57 and the bank 70 and that have a shape surrounding the filter layer which should be formed later are obtained at the same time as shown in FIG. 16(e). Stated another way, the opening 57A corresponding to the reflective part 66 and the transmissive part 68 is obtained.

Areas which are surrounded or defined by the black matrix 57, the bank 70, the over coat layer 65 and the transmissive part 68 are the discharged portions 58R, 58G and 58B. The bank 70 is light transmissible. Also, as mentioned above, the black matrix 57 is an example of the first layer of the invention, and the bank 70 is an example of the second layer of the invention.

In this manner, the area that is defined by the black matrix 57 and the bank 70 (in other words, the discharged portions 58R, 58G and 58B) is provided on the base substrate 50A by forming the black matrix 57 and the bank 70 located on the black matrix 57.

Figure 17A:
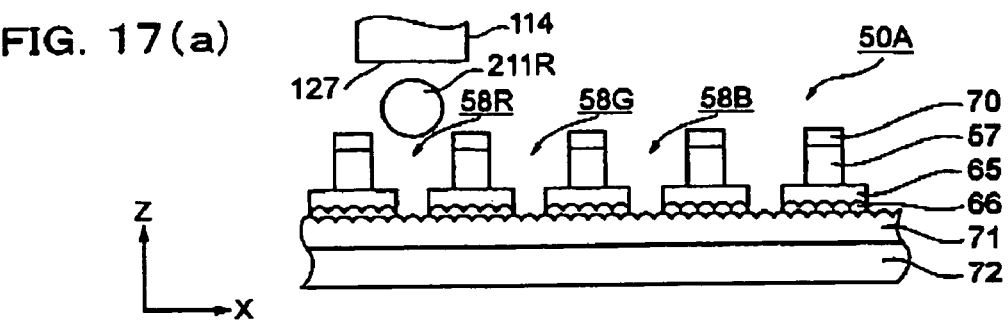
FIGS. 17(a) through (d) shows a frame format of a discharging method of the second exemplary embodiment.

The base substrate 50A on which the discharged portions 58R, 58G and 58B are formed is carried by the carrier device 170 (FIG. 1) to the stage 106 of the discharging device 100R. Then, as shown in FIG. 17(a), the discharging device 100R discharges the color filter material 211R from the head 114 so as to form the layer of the color filter material 211R on all the discharged portions 58R. A method in which the discharging device 100R discharges the color filter material 211R is the same as the way described above with reference to FIGS. 10, 11 and 12. After the layer of the color filter material 211R is formed on all the discharged portions 58R of the base substrate 50A, the carrier device 170 puts the base substrate 50A within the drying device 150R. Then, the filter layer 211FR is obtained on the discharged portions 58R by completely drying the color filter material 211R on the discharged portions 58R.

Figure 17B:
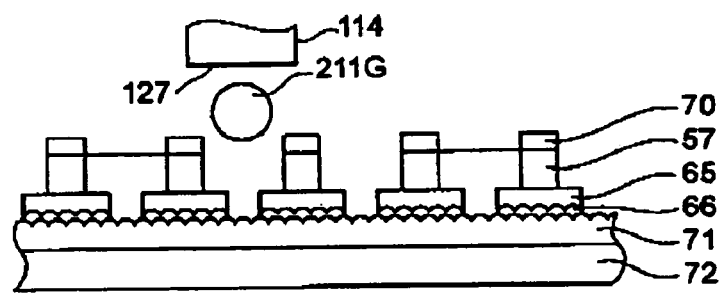

Next, the carrier device 170 puts the base substrate 50A on the stage 106 of the discharging device 100G. Then, as shown in FIG. 17(b), the discharging device 100G discharges the color filter material 211G from the head 114 so as to form the layer of the color filter material 211G on all the discharged portions 58G. A method in which the discharging device 100G discharges the color filter material 211G is the same as the way described above with reference to FIGS. 10, 11 and 12. After the layer of the color filter material 211G is formed on all the discharged portions 58G of the base substrate 50A, the carrier device 170 puts the base substrate 50A within the drying device 150G. Then, the filter layer 211FG is obtained on the discharged portions 58G by completely drying the color filter material 211G on the discharged portions 18G.

Figure 17C:
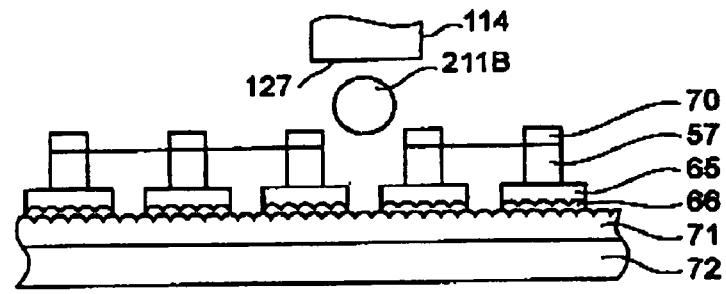
Figure 17D:
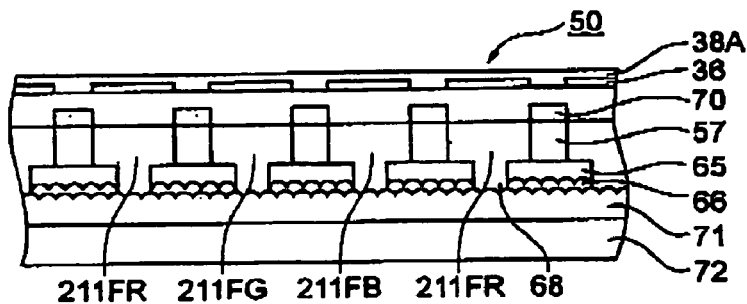

Next, the carrier device 170 puts the base substrate 50A on the stage 106 of the discharging device 100B. Then, as shown in FIG. 17(c), the discharging device 100B discharges the color filter material 211B from the head 114 so as to form the layer of the color filter material 211B on all the discharged portions 58B. A method in which the discharging device 100B discharges the color filter material 211B is the same as the way described above with reference to FIGS. 10, 11 and 12. After the layer of the color filter material 211B is formed on all the discharged portions 58B of the base substrate 10A, the carrier device 170 puts the base substrate 50A within the drying device 150B. Then, the filter layer 211FB is obtained on the discharged portions 58B by completely drying the color filter material 211B on the discharged portions 58B.

As mentioned above, the transmissive part 68 is approximately the elliptical shape as shown in detail in FIG. 21(b). More particularly, the transmissive part 68 is approximately the elliptical shape (the track shape) which is consisted of the pair of straight lines and the pair of semicircles. Because the transmissive part 68 does not have any corners which it is difficult to be filled with the color filter materials 211R, 211G and 211B, the whole surface of the transmissive part 68 can be filled with the color filter materials 211R, 211G and 211B without leaving any unfilled parts. Therefore, when the color filter materials 211R, 211G and 211B are dried, the transmissive parts 68 are covered with the filter layers 211FR, 211FG and 211FB without leaving any space between.

In this exemplary embodiment, the bank 70 has the water-shedding quality against the color filter materials 211R, 211G and 211B. Further, the water-shedding quality of the black matrix 57 against the color filter materials 211R, 211G and 211B is lower than that of the bank 70 against the color filter materials 211R, 211G and 211B. The black matrix 57 rather shows the lyophilic quality to the color filter materials 211R, 211G and 211B. The reason for this is that the fluorinated polymer is blended in the bank 70. In contrast, the black matrix 57 does not contain any fluorinated polymers. Generally, the surface of the resin that contains the fluorinated polymer shows a higher water-shedding quality against the carrier fluid that is contained in the liquid color filter materials compared with the surface of the resin that does not contain the fluorinated polymer. In contrast, many resins that do not contain fluorine show the lyophilic quality to the above-mentioned liquid materials.

According to this embodiment, since the bank 70 shows the relatively high water-shedding quality, the color filter materials droplets that have just arrived at the discharged portions 58R, 58G and 58B flow out to the black matrix 57 without going beyond the bank 70 and without flowing out of the discharged portions 58R, 58G and 58B.

Further, since a layer that shows an intended water-shedding quality and a layer that shows an intended lyophilic quality are formed, a surface quality modification process to give the black matrix 57 or the bank 70 the water-shedding quality or the lyophilic quality is not necessary. For example, the plasma treatment and the oxygen plasma treatment using tetrafluoromethane as a treatment gas are not necessary to be performed.

Next, the carrier device 170 puts the base substrate 50A within the oven 160. Then, the filter layers 211FR, 211FG and 211FB are heated again (post-bake) in the oven 160.

Next, the carrier device 170 puts the base substrate 50A on the stage 106 of the discharging device 100C. The discharging device 100C discharges the liquid material so as to form the planarizing layer 74 covering the filter layers 211FR, 211FG and 211FB and the bank 70.

After the planarizing layer 74 that covers the filter layers 211FR, 211FG and 211FB and the bank 70 is formed, the carrier device 170 puts the base substrate 50A within the oven 150C. Then the planarizing layer 74 is completely dried in the oven 150C, and then the curing device 165 heats the planarizing layer 74, and it gets hardened completely.

Then, the plurality of electrodes 36 are formed on the planarizing layer 74 and the alignment film 38A is formed to cover the plurality of electrodes 36 and the planarizing layer 74. Accordingly, the base substrate 50A becomes the color filter substrate 50 as shown in FIG. 17(*d*).

Next, the color filter substrate 10 and the counter substrate that is made separately are sealed together in such way that the alignment film 38A opposes the alignment film 38B interposing the spacers therebetween. Then, a space between the two alignment films is filled with a liquid crystal material. After that, the polarization plate 20A and the polarization plate 20B are provided, and the light source member 16 is also provided. Finally, the liquid crystal display device 51 is obtained.

Examples of electronic equipment that includes the above-described embodiments are described.

Figure 18:
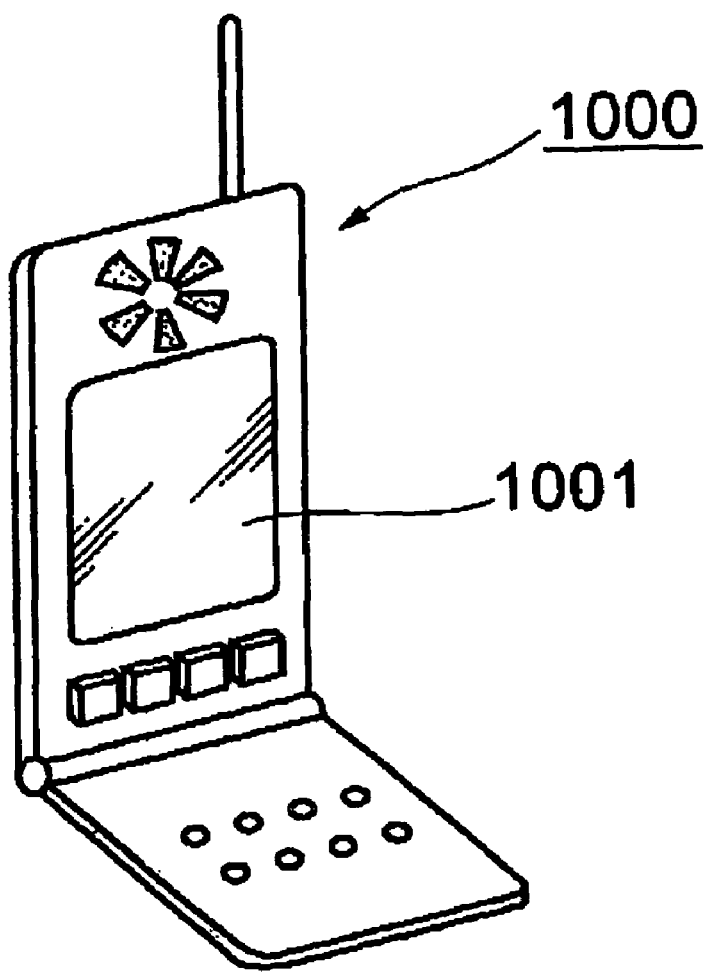
FIG. 18 is a view showing a frame format of a cellular phone of a third exemplary embodiment.

FIG. 18 is a perspective view showing an example of a cellular phone. As shown in FIG. 18, a cellular phone 1000 has a liquid crystal display member 1001. Either the liquid crystal display device 11 or the liquid crystal display device 51 can be applied as the liquid crystal display member 1001.

Figure 19:
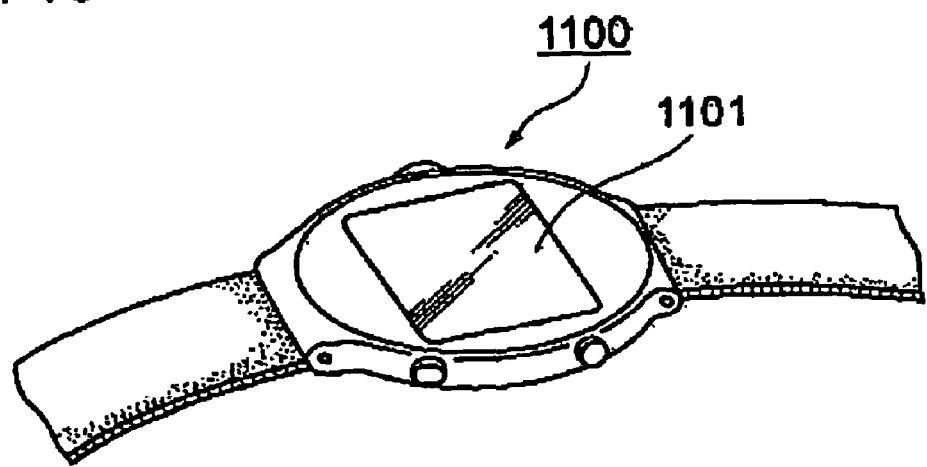
FIG. 19 is a view showing a frame format of a wristwatch type electronic equipment of the third exemplary embodiment.

FIG. 19 is a perspective view showing an example of wristwatch type electronic equipment. In FIG. 19, a watch body 1100 has the liquid crystal display member 1001. Either the liquid crystal display device 11 or the liquid crystal display device 51 can be applied as the liquid crystal display member 1001.

FIG. 20 is a perspective view showing an example of a portable information processor, such as a personal computer. In FIG. 20, an information processor 1200 has an input member 1202, such as a keyboard, a body of the information processor 1204 and a liquid crystal display using a liquid crystal display member 1206. Either the liquid crystal display device 11 or the liquid crystal display device 51 can be applied as the liquid crystal display member 1206.

Since the electronic equipment shown in FIG. 18 through 20 have the liquid crystal display member in which the above-described liquid crystal display device is used, the electronic equipment having a liquid crystal display member that has a high level visibility and a fine coloration both in the reflective mode and the transmissive mode.

In the first through third exemplary embodiments, the shape of the transmissive part 28 and the shape of the transmissive part 68 are approximately the elliptical shape. However, it should be understood that the shape of the transmissive part 28 and the shape of the transmissive part 68 may be a rectangle as shown in FIG. 21(*a*). Even if the shape of the transmissive part 28 and the transmissive part 68 is rectangular, the step locating at the border between the reflective part and the transmissive part can be adequately covered with discharged droplets as long as the discharging the material to the transmissive part 28 or 68 and the discharging the material to the reflective part 26 or 66 are conducted in this order. However, when the approximately elliptical shape transmissive part and the discharging method to the transmissive part are combined, certainty of covering the step will rise.

The color filter substrate of the above-described first and second embodiment is applied to the liquid crystal display device. However, the color filter substrate of the first and second embodiment may be applied to other display device than the liquid crystal display device. In this specification, the display device includes a plasma display device, a liquid crystal display device, an electro-luminescence display device, a display device using an electron emission element, such as a field emission display (FED) and a surface conduction electron emitter display (SED) and the like.

Even when the display device is not the transflective display device, the color purity can be improved with the above-described color filter substrate. Therefore, it is preferred that the color filter substrates of the first and second exemplary embodiment are provided in various display devices.

What is claimed is:

1. A method of manufacturing a color filter substrate, comprising:

forming a reflective part and a transmissive part that is an opening in the reflective part, the transmissive part being formed in an approximately elliptical shape on a surface of a light transmittable member;

forming a first layer having an opening corresponding to the reflective part and the transmissive part;

applying a liquid color filter material inside the opening so as to cover the reflective part and the transmissive part, the liquid color filter material being disposed in the opening within the reflective part that corresponds to the transmissive part; and forming a filter layer by drying the applied liquid color filter material.

2. The method of claim 1, further comprising:

forming a light transmittable substrate below the reflective part, forming a resin scattering layer between the light transmittable substrate and the reflective part, and forming irregular concavities and convexities on the resin scattering layer, and on a reflecting surface of the reflective part, a part of the resin scattering layer, which is exposed in the opening in the reflective part and which corresponds to the transmissive part, also having the irregular concavities and convexities.

* * * * *